(12) United States Patent
Horikawa et al.

(10) Patent No.: US 9,728,343 B2
(45) Date of Patent: Aug. 8, 2017

(54) ELECTRICAL STORAGE DEVICE ELEMENT AND ELECTRICAL STORAGE DEVICE

(71) Applicant: MURATA MANUFACTURING CO., LTD., Nagaokakyo-shi, Kyoto-Fu (JP)

(72) Inventors: Keiji Horikawa, Nagaokakyo (JP);
Hiroki Horiguchi, Nagaokakyo (JP);
Yukio Ehara, Nagaokakyo (JP);
Yasuhiko Ueda, Nagaokakyo (JP);
Hiroyuki Harada, Nagaokakyo (JP);
Masaharu Itaya, Nagaokakyo (JP);
Yasutake Fukuda, Nagaokakyo (JP);
Shigeo Hayashi, Nagaokakyo (JP)

(73) Assignee: MURATA MANUFACTURING CO., LTD., Nagaokakyo-Shi, Kyoto-Fu (JP)

( * ) Notice: Subject to any disclaimer, the term of this patent is extended or adjusted under 35 U.S.C. 154(b) by 563 days.

(21) Appl. No.: 14/141,573

(22) Filed: Dec. 27, 2013

(65) Prior Publication Data

US 2014/0106213 A1    Apr. 17, 2014

Related U.S. Application Data

(63) Continuation of application No. PCT/JP2012/061533, filed on May 1, 2012.

(30) Foreign Application Priority Data

Jun. 28, 2011    (JP) .................................. 2011-142468

(51) Int. Cl.
*H01M 10/0585* (2010.01)
*H01G 11/24* (2013.01)
(Continued)

(52) U.S. Cl.
CPC ............. *H01G 11/24* (2013.01); *H01G 11/04* (2013.01); *H01G 11/12* (2013.01); *H01G 11/28* (2013.01);
(Continued)

(58) Field of Classification Search
CPC ........ H01G 11/24; H01G 11/04; H01G 11/12; H01G 11/28; H01G 11/52; H01G 11/70;
(Continued)

(56) References Cited

U.S. PATENT DOCUMENTS

2002/0092558 A1* 7/2002 Kim .................... H01M 14/005
136/244

FOREIGN PATENT DOCUMENTS

EP          0849819      *  6/1996   ............ H01M 10/40
JP         59-048917         3/1984
(Continued)

OTHER PUBLICATIONS

International Search Report and Written Opinion for PCT/JP2012/061533, mailed Aug. 14, 2012.
(Continued)

*Primary Examiner* — Helen O Conley
(74) *Attorney, Agent, or Firm* — Arent Fox LLP

(57) ABSTRACT

A highly-reliable electrical storage device element and electrical storage device, in each of which on predetermined regions of predetermined end surfaces of a laminate forming an electrical storage component, sprayed end surface electrodes each having a high bond strength to the laminate are provided.

10 Claims, 17 Drawing Sheets

(51) Int. Cl.
*H01M 4/64* (2006.01)
*H01M 10/04* (2006.01)
*H01G 11/52* (2013.01)
*H01G 11/76* (2013.01)
*H01M 2/16* (2006.01)
*H01M 2/26* (2006.01)
*H01G 11/04* (2013.01)
*H01G 11/12* (2013.01)
*H01G 11/28* (2013.01)
*H01G 11/70* (2013.01)
*H01M 10/052* (2010.01)

(52) U.S. Cl.
CPC ............. *H01G 11/52* (2013.01); *H01G 11/70* (2013.01); *H01G 11/76* (2013.01); *H01M 2/166* (2013.01); *H01M 2/266* (2013.01); *H01M 4/64* (2013.01); *H01M 10/04* (2013.01); *H01M 10/0413* (2013.01); *H01M 10/052* (2013.01); *Y02E 60/13* (2013.01)

(58) Field of Classification Search
CPC ...... H01G 11/76; H01M 2/166; H01M 2/266; H01M 4/64; H01M 10/04; H01M 10/0413; H01M 10/052
See application file for complete search history.

(56) References Cited

FOREIGN PATENT DOCUMENTS

| | | | |
|---|---|---|---|
| JP | S63-224315 A | 9/1988 | |
| JP | 6-231796 A | 8/1994 | |
| JP | 2002-352850 A | 12/2002 | |
| JP | 2004-14373 * | 1/2004 | ............ H01M 10/40 |
| JP | 2004-311073 A | 11/2004 | |

OTHER PUBLICATIONS

International Search Report for PCT/JP2012/061533, mailed Aug. 14, 2012.

* cited by examiner

ELECTRICAL STORAGE DEVICE ELEMENT AND ELECTRICAL STORAGE DEVICE

CROSS REFERENCE TO RELATED APPLICATIONS

The present application is a continuation of PCT/JP2012/061533 filed May 1, 2012, which claims priority to Japanese Patent Application No. 2011-142468, filed Jun. 28, 2011, the entire contents of each of which are incorporated herein by reference.

FIELD OF THE INVENTION

The present invention relates to an electrical storage device element and an electrical storage device and, in particular, to an electrical storage device element used, for example, for a battery, such as a lithium ion secondary battery, having a high energy density, a lithium ion capacitor, or an electrical double layer capacitor and an electrical storage device using the electrical storage device element.

BACKGROUND OF THE INVENTION

As one of electrical storage devices represented, for example, by a lithium ion secondary battery, a lithium ion capacitor, and an electrical double layer capacitor, an electrical double layer capacitor having the structure as disclosed in Patent Document 1 has been known. This electrical double layer capacitor has end surface electrodes (sprayed end surface electrodes) formed by a method, such as plasma spraying or arc spraying, on end surfaces of a laminate formed by laminating collectors, polarizable electrodes, and separators (for example, see FIG. 3 of Patent Document 1).

In addition, as a related laminate-type storage battery, a laminate-type battery having the structure as disclosed in Patent Document 2 has been proposed. This laminate-type battery has end surface electrodes formed by one of plating, baking, and a thin film forming method, such as deposition or sputtering, on end surfaces of a laminate in which positive electrodes each formed by arranging positive electrode materials on a collector metal film and negative electrodes each formed by arranging negative electrode materials on a collector metal film are laminated and integrated to each other with high molecular weight films (separators) which are each impregnated with an electrolyte and which are interposed between the positive electrodes and the negative electrodes (see FIGS. 1 and 2 of Patent Document 2).

However, in the case of the electrical double layer capacitor disclosed in the above Patent Document 1, the collectors, the polarizable electrodes, and the separators, which collectively form the laminate, are laminated to each other while being not adhered to each other, and when the sprayed end surface electrodes are formed on the end surfaces of the laminate as described above, the following problems may arise.

(a) Since the individual layers including the collectors, the polarizable electrodes, and the separators are not adhered to each other, and the layers in the vicinity of the end surface of the laminate are liable to be moved and deformed, kinetic energy of sprayed particles is absorbed, for example, by the movement and the deformation of the individual layers. Hence, even when colliding against the end surface of the laminate, the sprayed particles are suppressed from intruding into the laminate and being deformed, and as a result, a tight bond of the sprayed particles to the end surface of the laminate by an anchor effect cannot be expected.

(b) In order to increase the bond strength of the sprayed particles to the end surface of the laminate, when the kinetic energy of the sprayed particles is increased, the sprayed particles may enter gaps between constituent members of the laminate in some cases, and thereby the shape of the end surface of the laminate is destroyed. Hence, as a result, a sprayed end surface electrode preferable for the end surface of the laminate is difficult to form.

(c) Since there are gaps between the individual layers, the sprayed particles enter the gaps and may be short-circuited with internal electrodes (positive electrodes or negative electrodes) functioning as counter electrodes in some cases. That is, according to Patent Document 1, although spacers are provided so as to prevent a short circuit with the positive electrode and the negative electrode, the spacers each cover only an end surface portion of the electrode (see FIG. 3 of patent document 1), and the sprayed particles may enter through gaps between the spacers and the separators and may come into contact with the polarizable electrode layers to cause a short circuit in some cases.

(d) In order to arrange the spacers after the laminate is formed, a complicated process is required, and as a result, an increase in cost may occur.

In addition, in the case of the laminate-type battery disclosed in the above Patent Document 2, the end surface electrode formed by one of plating, baking, and a thin film forming method, such as deposition or sputtering, has the following problems.

(a) Since having a small thickness, the end surface electrode formed by a method, such as plating, deposition, or sputtering, is liable to be broken by a stress generated by expansion and contraction of the laminate, and the reliability is low.

(b) When the thin end surface electrode formed by a method, such as plating, deposition, or sputtering, is connected to a lead terminal or a package land by a welding or ultrasonic bonding, which is a bonding method to secure a bond having a low resistance and a high reliability, in the case of the welding, welding defects may occur in some cases since the amount of a metal necessary for welding cannot be secured, and in the case of the ultrasonic welding, since the film may be broken by ultrasonic vibration in some cases, welding having a sufficiently high reliability is difficult to obtain.

(c) Furthermore, when the end surface electrode is formed by a baking method, a binder and the like contained in the laminate may be deteriorated by heat, and as a result, the electrical properties may not be obtained in some cases.

Patent Document 1: Japanese Unexamined Patent Application Publication No. S59-048917
Patent Document 2: Japanese Unexamined Patent Application Publication No. H06-231796

SUMMARY OF THE INVENTION

The present invention was made to overcome the problems described above and provides an electrical storage device element and an electrical storage device, each of which has a highly reliability, the electrical storage device element including sprayed end surface electrodes on end surfaces of a laminate forming an electrical storage component, the sprayed end surfaces each having a high bond strength to the laminate and an excellent resistance against a stress generated by expansion and contraction of the laminate, each containing a metal, the amount of which can be increased, and each being capable of forming a tight connection to a lead terminal and/or a package land.

In order to solve the problems described above, an electrical storage device element of the present invention comprises:

a laminate having the structure in which positive electrode layers each formed by arranging a positive electrode active material on a surface of a positive electrode collector and negative electrode layers each formed by arranging a negative electrode active material on a surface of a negative electrode collector are alternately laminated with resin-containing insulating layers interposed therebetween so as not to be electrically connected to each other and are also adhered to and integrated with each other by the resin-containing insulating layers; the positive electrode collectors forming the positive electrode layers are extended to a positive electrode extension region of a predetermined end surface; and the negative electrode collectors forming the negative electrode layers are extended to a negative electrode extension region of a predetermined end surface; and a pair of end surface electrodes formed by spraying an electrode material to the positive electrode extension region of the predetermined end surface of the laminate and to the negative electrode extension region of the predetermined end surface of the laminate.

In the electrical storage device element described above, the relationship between an average thickness x1 of the positive electrode collectors exposed to the positive electrode extension region of the laminate and an average thickness y1 of the resin-containing insulating layers exposed to the positive electrode extension region satisfies requirements represented by the following expressions (1), (2), and (3).

$$0.2 \ \mu m \leq x1 \leq 2.0 \ \mu m \tag{1}$$

$$10 \ \mu m \leq y1 \leq 30 \ \mu m \tag{2}$$

$$y1 \geq 15x1-5 \tag{3}$$

In addition, in the electrical storage device element described above, the relationship between an average thickness x2 of the negative electrode collectors exposed to the negative electrode extension region of the laminate and an average thickness y2 of the resin-containing insulating layers exposed to the negative electrode extension region satisfies requirements represented by the following expressions (4), (5), and (6):

$$0.2 \ \mu m \leq x2 \leq 2.0 \ \mu m \tag{4}$$

$$10 \ \mu m \leq y2 \leq 30 \ \mu m \tag{5}$$

$$y2 \geq 15x2-5 \tag{6}.$$

In addition, in the electrical storage device element of the present invention, the resin-containing insulating layers each preferably include a resin material having a glass transition temperature of −20° C. or less.

In addition, the resin-containing insulating layers forming the positive electrode extension region of the end surface of the laminate to which the positive electrode collectors are extended and the negative electrode extension region of the end surface of the laminate to which the negative electrode collectors are extended are preferably formed to have concave portions so as to increase contact areas with the end surface electrodes.

In addition, the positive electrode collectors and the negative electrode collectors are preferably exposed to voids of the concave portions so as to increase a contact area between the end surface electrode and the positive electrode collectors and a contact area between the end surface electrode and the negative electrode collectors.

In addition, the end surface electrodes formed on the positive electrode extension region having at least one concave portion and on the negative electrode extension region having at least one concave portion preferably have surfaces having concave portions corresponding to the shapes of the positive electrode extension region and the negative electrode extension region, in each of which the concave portion is formed.

In addition, an electrical storage device of the present invention comprises the electrical storage device element according to one of Claims 1 to 5. In the electrical storage device, the electrical storage device element is received and air-tightly sealed with an electrolyte in a package having a positive electrode package electrode and a negative electrode package electrode while the end surface electrode electrically connected to the positive electrode layers and the end surface electrode electrically connected to the negative electrode layers are connected to the positive electrode package electrode and the negative electrode package electrode, respectively.

In an electrical storage device element of the present invention, a laminate has the structure in which positive electrode layers and negative electrode layers are alternately laminated with resin-containing insulating layers interposed therebetween and are adhered to and integrated with each other by the resin-containing insulating layers and in which positive electrode collectors are extended to a positive electrode extension region of a predetermined end surface and negative electrode collectors are extended to a negative electrode extension region of a predetermined end surface, and end surface electrodes (sprayed end surface electrodes) are formed by a spray method on the positive electrode extension region and the negative electrode extension region. In the electrical storage device element described above, the relationship between an average thickness x1 of the positive electrode collectors exposed to the positive electrode extension region of the laminate and an average thickness y1 of the resin-containing insulating layers exposed to the positive electrode extension region is set to satisfy the following requirements:

$$0.2 \ \mu m \leq x1 \leq 2.0 \ \mu m \tag{1}$$

$$10 \ \mu m \leq y1 \leq 30 \ \mu m \tag{2}$$

$$y1 \geq 15x1-5 \tag{3; and}$$

the relationship between an average thickness x2 of the negative electrode collectors exposed to the negative electrode extension region of the laminate and an average thickness y2 of the resin-containing insulating layers exposed to the negative electrode extension region is set to satisfy the following requirements:

$$0.2 \ \mu m \leq x2 \leq 2.0 \ \mu m \tag{4}$$

$$10 \ \mu m \leq y2 \leq 30 \ \mu m \tag{5}$$

$$y2 \geq 15x2-5 \tag{6}.$$

Hence, the following effects can be obtained.

In addition, in the present invention, "the relationship between an average thickness x1 of the positive electrode collectors and an average thickness y1 of the resin-containing insulating layers and the relationship between an average thickness x2 of the negative electrode collectors and an average thickness y2 of the resin-containing insulating layers each satisfy the above requirements" indicates that in regions other than regions including the uppermost and the lowermost positive and negative electrode collectors exposed to the predetermined end surfaces and the outside thereof, the relationship between x1 and y1 and the relationship between x2 and y2 satisfy the above requirements represented by the expressions (1), (2), (3), (4), (5), and (6).

The reason the relationship between x1 and y1 and the relationship between x2 and y2 in the above limited regions are set to the requirements is that the influence of an external layer region on the region which includes the outermost and the lowermost collectors and the outside thereof is taken into consideration.

(a) Since the positive electrode layers, the negative electrode layers, and the resin-containing insulating layers are adhered to and integrated with each other, the end surfaces of the laminate each become a hard and robust surface, and when sprayed particles collide against the end surfaces of the laminate so as to form sprayed end surface electrodes, the sprayed particles are remarkably deformed and driven into the surfaces of the resin-containing insulating layers which form the end surfaces of the laminate. Hence, highly-reliable sprayed end surface electrodes each surely bonded to one end surface of the laminate can be formed by an anchor effect.

(b) Compared to an electrode formed by a method, such as deposition or sputtering, the sprayed end surface electrode can be formed as a thick end surface electrode and is excellent in resistance against a stress generated, for example, by expansion and contraction of the laminate. In addition, since the amount of a metal can be increased, a tight connection to a lead terminal and/or a package land can be obtained.

(c) In addition, since the resin-containing insulating layer contains a resin and is softer than the positive electrode collector and the negative electrode collector, each of which is formed of a metal, the sprayed particles are efficiently driven into the end surface of the laminate. As a result, a highly-reliable electrical storage device element having sprayed end surface electrodes each tightly bonded to the end surface of the laminate by an anchor effect can be obtained.

In addition, since it has been believed that the bond of the sprayed end surface electrode to the positive electrode collector or the negative electrode collector, which is exposed to the end surface, is formed by a weak intermolecular force through an oxide film and/or a hydroxide film and by an anchor effect, the bond force is thought to be weak as compared to that of the bond between the resin-containing organic insulating layer and the sprayed end surface electrode. Hence, it is believed that the ratio of the exposed area of the positive electrode collector or the negative electrode collector to the entire area of the region of the end surface of the laminate on which the sprayed end surface electrode is formed is preferably suppressed. Accordingly, in the present invention, the ratio of the exposed area of the positive electrode collector or the negative electrode collector to the entire area of the above region of the laminate is controlled so as not be excessively large, and the contact area between the sprayed end surface electrode and the resin-containing insulating layer is sufficiently secured so as to realize a high bond strength.

In addition, in the present invention, as the resin-containing insulating layer, for example, although a layer may be mentioned in which an inorganic oxide (including a composite oxide), such as silica, alumina, titania, zirconia, or barium titanate, is bound together with an organic binder, such as an urethane, a PVDF-HFP (copolymer of poly (vinylidene fluoride) and hexafluoropropylene), a PVDF (poly(vinylidene fluoride)), a silicone, a poly(amide imide), a PTFE (polytetrafluoroethylene), or a carboxymethyl cellulose, a layer having another composition may also be used.

In addition, in the resin-containing insulating layer, a solid electrolyte, such as a gel electrolyte, using a resin-containing insulating layer as a dispersoid may be contained.

In addition, besides a printing method, the resin-containing insulating layer may also be formed, for example, by a method in which adhesive resin-containing insulating sheets are laminated to each other.

In addition, in the electrical storage device element of the present invention, when a resin material having a glass transition temperature of $-20°$ C. or less is used to form the resin-containing insulating layer, the resin is likely to be deformed when the sprayed particles are made to collide against the end surface of the laminate, and the sprayed particles are easily bonded to the end surface by an anchor effect; hence, the effect of the present invention can be more effectively achieved.

In addition, since the concave portion is formed in the resin-containing insulating layer forming the end surface of the laminate, the contact area (bond area) between the sprayed end surface electrode and the resin-containing insulating layer forming the end surface is increased, and the bond strength of the sprayed end surface electrode can be increased in proportion to the increase in the contact area.

In addition, since the positive electrode collector and the negative electrode collector are each exposed to the void in the concave portion so as to increase the contact area between the end surface electrode and the positive electrode collector and that between end surface electrode and the negative electrode collector, the resistance of the electrical storage device element and that of the electrical storage device can be decreased, and in addition, the bond strength of the sprayed end surface electrode to the end surface of the laminate can also be increased.

In addition, in the present invention, as an example in which the positive electrode collector and the negative electrode collector are each exposed to the void of the concave portion, for example, there may be mentioned the case in which the resin-containing insulating layer around the positive electrode extension region or the negative electrode extension region of the end surface of the laminate to which the positive electrode collectors or the negative electrode collectors are exposed is removed so as to expose the positive electrode collectors or the negative electrode collectors to side surfaces of the concave portion or the case in which the positive electrode collectors or the negative electrode collectors are allowed to protrude from the bottom surface of the concave portion.

In addition, when the sprayed end surface electrode is formed so that the surface thereof formed on the end surface having at least one concave portion has a concave portion corresponding to the shape of the end surface of the laminate in which the concave portion is formed, the sprayed end surface electrode has a structure bent along the shape of the end surface of the laminate in which the concave portion is formed. Since this bent portion is present, transmission of an internal stress of the sprayed end surface electrode is suppressed and reduced, and the warpage and peeling of the sprayed end surface electrode can be suppressed.

In addition, an electrical storage device of the present invention is formed in such a way that the electrical storage device element described above is received and air-tightly sealed with an electrolyte in a package including a positive electrode package electrode and a negative electrode package electrode while the sprayed end surface electrode electrically connected to the positive electrode layers is connected to the positive electrode package electrode, and the sprayed end surface electrode electrically connected to the negative electrode layers is connected to the negative electrode package electrode. Hence, an electrical storage device having a low resistance and a high reliability can be obtained.

DETAILED DESCRIPTION OF THE PREFERRED EMBODIMENTS

Hereinafter, with reference to examples of the present invention, the features of the present invention will be described in detail.

Example 1

Figure 1:
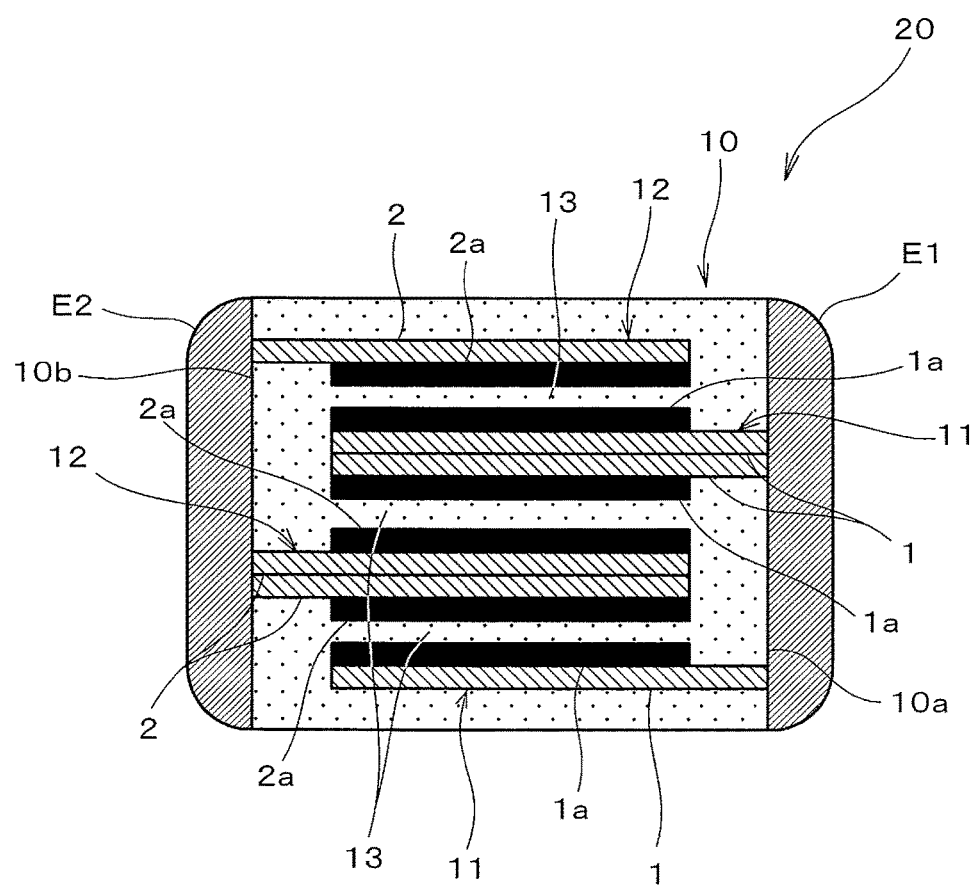
FIG. 1 is a front cross-sectional view schematically showing an electrical storage device element (electrical double layer capacitor element) according to an example of the present invention.

FIG. 1 is a front cross-sectional view showing the structure of an electrical storage device element (electrical double layer capacitor element) according to one example of the present invention.

An electrical storage device element 20 of this example includes a laminate 10 which is formed in such a way that positive electrode layers 11 and negative electrode layers 12 are alternately laminated with resin-containing insulating layers 13, each functioning as a separator, interposed therebetween so as not to be electrically connected to each other and are also adhered to and integrated with each other by the resin-containing insulating layers each also functioning as an adhesive layer, the positive electrode layers 11 each being formed of positive electrode active materials 1a arranged on a surface of a positive electrode collector 1, the negative electrode layers 12 each being formed of negative electrode active materials 2a arranged on a surface of a negative electrode collector 2, and the resin-containing insulating layers having a liquid containing property capable of containing an electrolyte (electrolytic solution). In addition, the positive electrode collectors 1 each forming the positive electrode layer 11 and the negative electrode collectors 2 each forming the negative electrode layer 12 are extended to end surfaces 10a and 10b, which are different from each other, of the laminate 10.

In addition, a pair of sprayed end surface electrodes E1 and E2 formed by spraying an electrode material are arranged, respectively, on the end surface 10a of the laminate 10 to which the positive electrode collectors 1 are extended and the end surface 10b of the laminate 10 to which the negative electrode collectors 2 are extended.

In addition, the relationship between an average thickness x1 of the positive electrode collectors 1 exposed to the end surface 10a of the laminate 10 on which the sprayed end surface electrode E1 is formed and an average thickness y1 of the resin-containing insulating layers exposed to the end surface 10a is set to satisfy requirements represented by the following expressions (1), (2), and (3), and the relationship between an average thickness x2 of the negative electrode collectors 2 exposed to the end surface 10b of the laminate 10 on which the sprayed end surface electrode E2 is formed and an average thickness y2 of the resin-containing insulating layers exposed to the end surface 10b is set to satisfy requirements represented by the following expressions (4), (5), and (6).

$$0.2 \text{ μm} \leq x1 \leq 2.0 \text{ μm} \tag{1}$$

$$10 \text{ μm} \leq y1 \leq 30 \text{ μm} \tag{2}$$

$$y1 \geq 15x1 - 5 \tag{3}$$

$$0.2 \text{ μm} \leq x2 \leq 2.0 \text{ μm} \tag{4}$$

$$10 \text{ μm} \leq y2 \leq 30 \text{ μm} \tag{5}$$

$$y2 \geq 15x2 - 5 \tag{6}$$

In addition, the electrical storage device element 20 shown in FIG. 1 has a length (distance between the sprayed end surface electrodes) of approximately 14 mm and a width of approximately 18 mm. However, the thickness (dimension in a lamination direction of the positive electrode layers and the negative electrodes) varies depending on a layer thickness condition of each layer.

Figure 2:
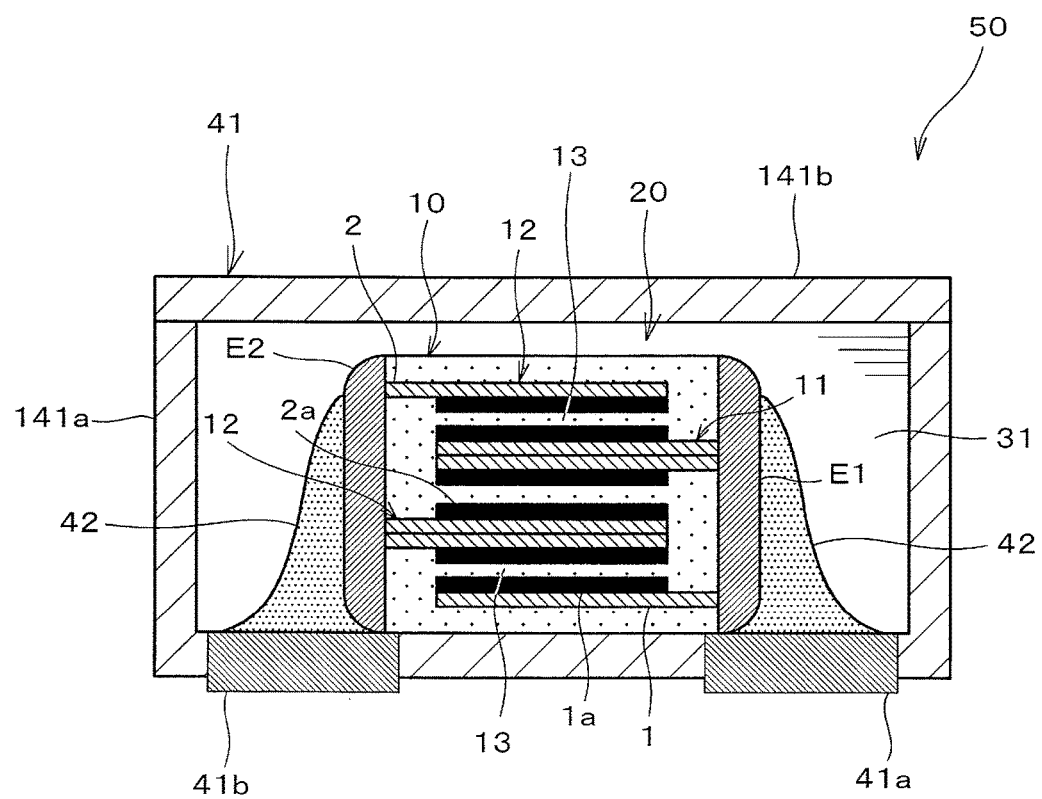
FIG. 2 is a front cross-sectional view schematically showing an electrical storage device (electrical double layer capacitor) formed using the electrical storage device element shown in FIG. 1.
Figure 3:
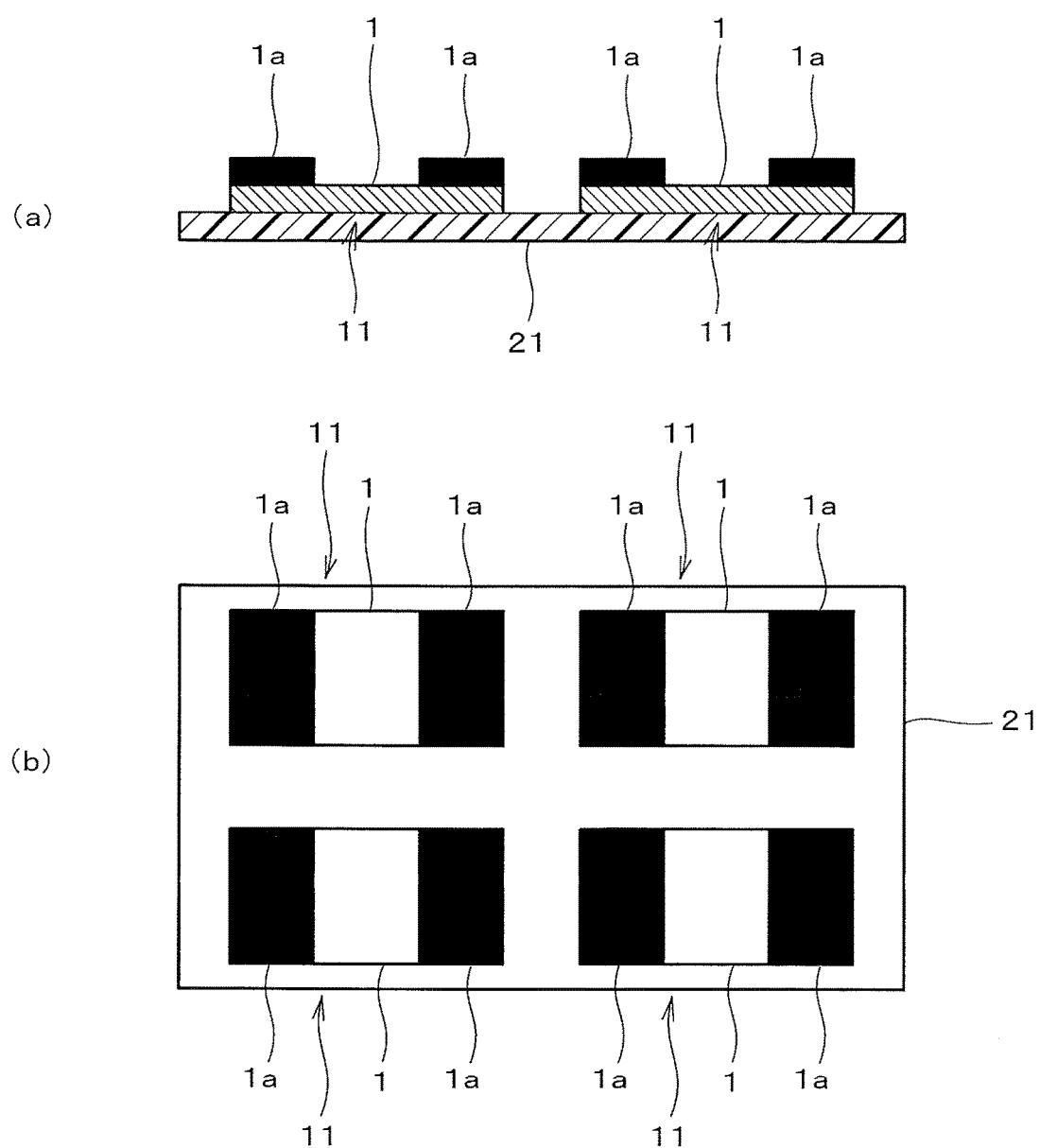
FIG. 3 includes views each showing one step of a method for manufacturing electrical storage device elements according to an example of the present invention, (a) is a front cross-sectional view showing the state in which a positive electrode layer is formed on a base film, and (b) is a plan view.

In addition, FIG. 2 is a front cross-sectional view showing the structure of an electrical storage device (electrical double layer capacitor) 50 according to one example of the present invention using the electrical storage device element 20 described above.

This electrical storage device (electrical double layer capacitor) 50 has the structure in which the electrical storage device element 20 according to one example of the present invention shown in FIG. 1 is received and air-tightly sealed with an electrolyte 31 in a package 41 which is formed of a package main body 141a and a lid portion 141b and which includes a positive electrode package electrode 41a and a negative electrode package electrode 41b while the sprayed end surface electrode E1 electrically connected to the positive electrode layers 11 of the electrical storage device element 20 is connected to the positive electrode package electrode 41a with an electrically conductive adhesive 42 interposed therebetween, and the sprayed end surface electrode E2 electrically connected to the negative electrode layers 12 is connected to the negative electrode package electrode 41b with the other electrically conductive adhesive 42 interposed therebetween.

Next, methods for manufacturing the electrical storage device element 20 and the electrical storage device 50 will be described. In addition, hereinafter, as a method for manufacturing an electrical storage device, a so-called multi-cavity formation method will be described in which after a collective structural body containing a plurality of elements is formed, the collective structural body is divided so as to simultaneously obtain discrete elements, and in FIGS. 3 to 11 used for explanation of individual steps, although the state obtained after the division is not particularly shown, a structural body formed in each step is partially schematically shown.

First, the following base film, positive electrode and negative electrode active materials, and resin-containing insulating paste are prepared.

[Base Film]

As the base film, a base film formed of a PET (poly(ethylene terephthalate)) and a silicone-based releasing layer provided thereon is prepared.

[Positive Electrode and Negative Electrode Active Materials]

A carbon paste to be used as a positive electrode active material and a negative electrode active material is formed by the following method.

First, raw materials are each weighed based on the following ratio.

(i) Carbon black (average particle diameter D50=100 nm) 31.7 g (ii) Carboxymethyl cellulose (CMC2260, manufactured by Daicel Chemical Industries, Ltd.) 3.0 g (iii) 38.8-wt % polyacrylate resin aqueous solution 2.0 g (iv) Deionized water 286 g Next, the above raw materials are mixed and kneaded together to form a carbon paste (positive electrode and negative electrode active materials).

[Formation of Resin-Containing Insulating Paste]

By the following method, a resin-containing insulating paste is formed to be used for forming a resin-containing insulating layer which is provided between the positive electrode layer and the negative electrode layer to insulate therebetween, which has a liquid containing property capable of containing an electrolyte (electrolytic solution), which functions as a separator, and in addition, which has an adhesive property to function as an adhesive layer to bond between the layers.

(1) Binder Solution

A PVDF-HDP (copolymer of a poly(vinylidene fluoride) and hexafluoropropylene) in an amount of 160 g is charged in a one-liter pot. Furthermore, 640 g of NMP (N-methyl pyrrolidone) is also charged in the pot described above.

Subsequently, mixing is performed (150 rpm, 24 hours) while the pot is held by a pot stand, so that a binder solution (binder solution containing PVDF-HFP in a NMP solvent at a rate of 20 wt %) is prepared.

(2) Resin-Containing Insulating Paste

In addition, the resin-containing insulating paste is formed by the following method using the above binder solution.

First, 83 g of a powder (alumina having a D50 of 0.3 μm) and 700 g of cobbles (zirconia balls having a diameter of 5 mm) are charged in a 500-mL pot, and 80 g of a NMP solvent is further charged therein. Subsequently, mixing is performed (150 rpm, 16 hours) while the pot is held by a pot stand.

Next, after 222 g of the binder solution formed by the method of the above (1) is charged in the pot, mixing is performed (150 rpm, 4 hours) while the pot is held by a pot stand, so that a paste (resin-containing insulating paste) forming the resin-containing insulating layer is formed.

[Formation of Electrical Storage Device Element]

(1) Formation of Positive Electrode Layer

First, on the base film formed of a PET (poly(ethylene terephthalate)) on which a silicon-based releasing layer is provided, which is prepared as described above, an Al film used for the positive electrode collector is formed.

In addition, as described later, when an Al film having a thickness of 0.05 to 2 μm is formed, a film is formed from Al by a vacuum deposition method as a collector (Al film) having a predetermined thickness.

In addition, the above method for forming an Al film is one example of a method for forming an Al film, and for example, a collector film (Al film) having a predetermined thickness may also be formed in such a way that after a rolled foil having a thickness of 12 µm is press-bonded onto a base film by a roll press, the foil is then etched with hydrofluoric acid to have a desired thickness.

Next, after a resist pattern is printed on the positive electrode collector film so that 5 and 10 rectangular patterns, each of which has a size of 20 mm by 10 mm, are arranged in a longitudinal direction and in a lateral direction, respectively, with intervals of 8 mm therebetween, the resist pattern is dried in a hot wind furnace at a temperature of 100° C. for 15 minutes.

Next, the positive electrode collector film is etched using the resist pattern as an etching mask, so that a positive electrode collector having the shape and the dimension corresponding to the resist pattern is formed. In particular, after the positive electrode collector film is immersed in a ferric chloride aqueous solution at 45° C. for a predetermined time to remove by wet etching, an Al film in a region which is not masked with the resist, a ferric chloride aqueous solution remaining on the base surface is removed by a water washing shower.

Subsequently, after the base film is allowed to pass through a butyl acetate shower to peel away the resist, butyl acetate remaining on the base surface is evaporated in a hot wind furnace at 60° C.

As a result, as shown in FIGS. 3(a) and 3(b), the positive electrode collector 1 having a rectangular pattern of a size of 20 mm by 10 mm is formed on a base film 21.

Next, as a surface treatment of the positive electrode collector (Al film), an oxide film on the surface of the positive electrode collector 1 is removed by a mixed acid containing hydrofluoric acid and sulfuric acid, and at the same time, surface fluorination is performed on the positive electrode collector 1.

Subsequently, as shown in FIGS. 3(a) and 3(b), the above carbon paste (positive electrode material paste) is screen-printed on a pair of regions located at two sides of the positive electrode collector 1 having a rectangular pattern of a size of 20 mm by 10 mm to form positive electrode active material patterns each having a rectangular shape of 6 mm by 10 mm and a thickness of 0.5 µm and is then dried at 80° C. for 20 minutes in a hot wind furnace, so that the positive electrode layer 11 having the positive electrode active materials 1a arranged on the surface of the positive electrode collector 1 is formed.

Figure 4:
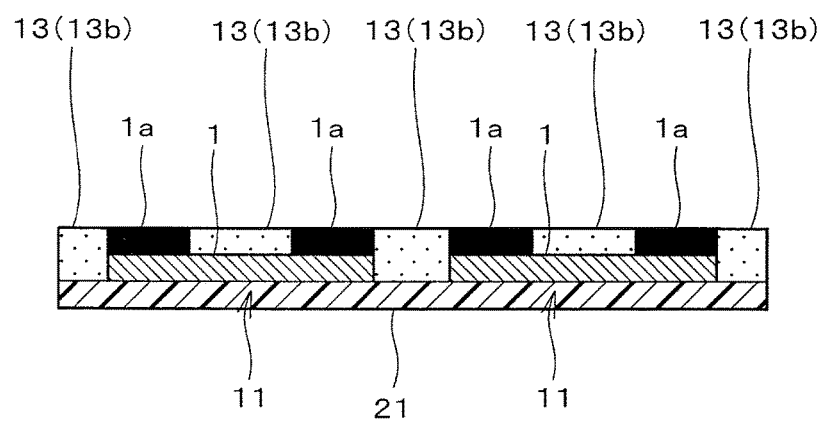
FIG. 4 is a view showing another step of the method for manufacturing electrical storage device elements according to the example of the present invention.

Next, as shown in FIG. 4, the resin-containing insulating paste formed as described above is printed on step portions. Accordingly, a resin-containing insulating layer 13 (13b) is formed which functions as a filling layer to fill the step portions and which also functions as an adhesive layer, and at the same time, the entire surface is planarized.

Figure 5:
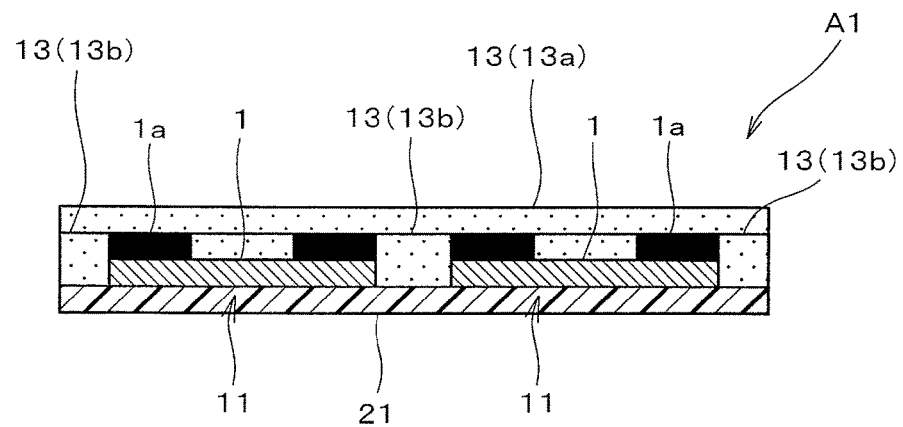
FIG. 5 is a view showing a positive electrode composite sheet formed in one step of the method for manufacturing electrical storage device elements according to the example of the present invention.

Subsequently, as shown in FIG. 5, the resin-containing insulating paste is printed so as to cover the positive electrode active materials 1a and the resin-containing insulating layer (filling layer) 13 (13b), so that a resin-containing insulating layer 13 (13a) is formed which functions as a separator (layer) interposed between the positive electrode layer 11 and the negative electrode layer 12 and which also functions to bond and integrate between the positive electrode layer 11 and the negative electrode layer 12. Accordingly, a positive electrode composite sheet A1 in which the positive electrode layers 11 are formed on the base film 21 is formed.

In addition, as the resin-containing insulating paste to form a layer used as the filling layer and the resin-containing insulating paste which functions as a separator and which is used to form a layer functioning to bond and integrate between the positive electrode layer and the negative electrode layer, the same resin-containing insulating paste is used in this example; however, depending on the case, different resin-containing insulating pastes may also be used in some cases.

In addition, in this example, although the positive electrode collector layer 1 is directly formed on the base film 21, for example, after an adhesive layer of a silicone resin or the like is formed on the surface of the base film 21, the positive electrode layer may be formed on the adhesive layer.

(2) Formation of Negative Electrode Layer

By the same method as that in the case in which the positive electrode layer 11 is formed in the step of the above (1), and by using the same materials as those used in the case in which the positive electrode layer 11 is formed, a negative electrode composite sheet A2 (see FIG. 6) having the structure (identical structure) corresponding to that of the positive electrode composite sheet A1 is formed.

In addition, in the following step (see FIG. 7) of forming a positive electrode/negative electrode integrated sheet B1 from the positive electrode composite sheet A1 and the negative electrode composite sheet A2, the negative electrode composite sheet A2 is shifted by a predetermined length and is then combined with the positive electrode composite sheet A1.

Figure 6:
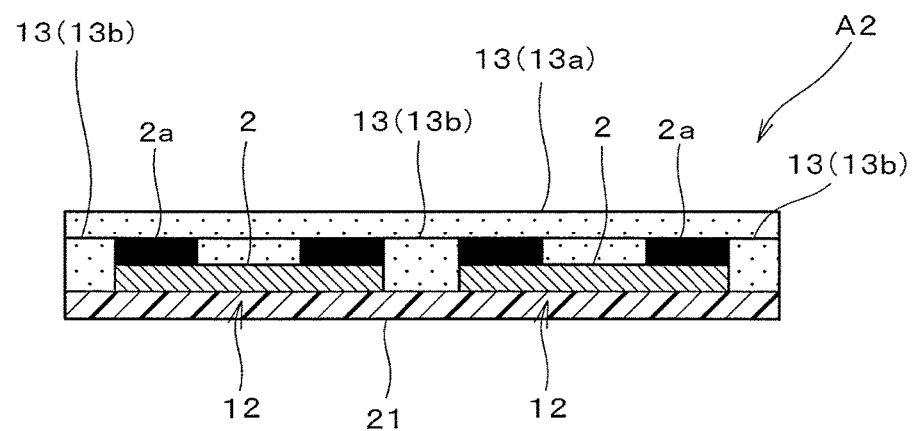
FIG. 6 is a view showing a negative electrode composite sheet formed in one step of the method for manufacturing electrical storage device elements according to the example of the present invention.

In this negative electrode composite sheet A2, an Al film used as the positive electrode collector of the positive electrode composite sheet A1 is used as the negative electrode collector 2 (FIG. 6), a layer formed from the carbon paste, which is used as the positive electrode active material of the positive electrode composite sheet A1, by screen printing and drying is used as the negative electrode active material 2a, and a layer formed of the negative electrode collector 2 and the negative electrode materials 2a provided thereon functions as the negative electrode layer 12 (FIG. 6).

In addition, as in the above case in which the positive electrode composite sheet A1 is formed, instead of directly forming the negative electrode collector layer on the base film, after an adhesive layer of a silicone resin or the like is formed on the surface of the base film, the negative electrode layer may be formed on the adhesive layer.

In addition, in this example, although Al is used as a constituent material of the collector, other known materials may also be used as the positive electrode collector material and the negative electrode collector material.

In addition, in this example, although carbon is used as a constituent material of the positive electrode active material and the negative electrode active material, other known materials may also be used as the positive electrode active material and the negative electrode active material.

(3) Lamination of Positive Electrode Layer (Positive Electrode Composite Sheet) and Negative Electrode Layer (Negative Electrode Composite Sheet)

Next, a step of forming a positive electrode/negative electrode integrated sheet by laminating the positive electrode layer 11 (positive electrode composite sheet A1) and the negative electrode layer 12 (negative electrode composite sheet A2) will be described.

Figure 7:
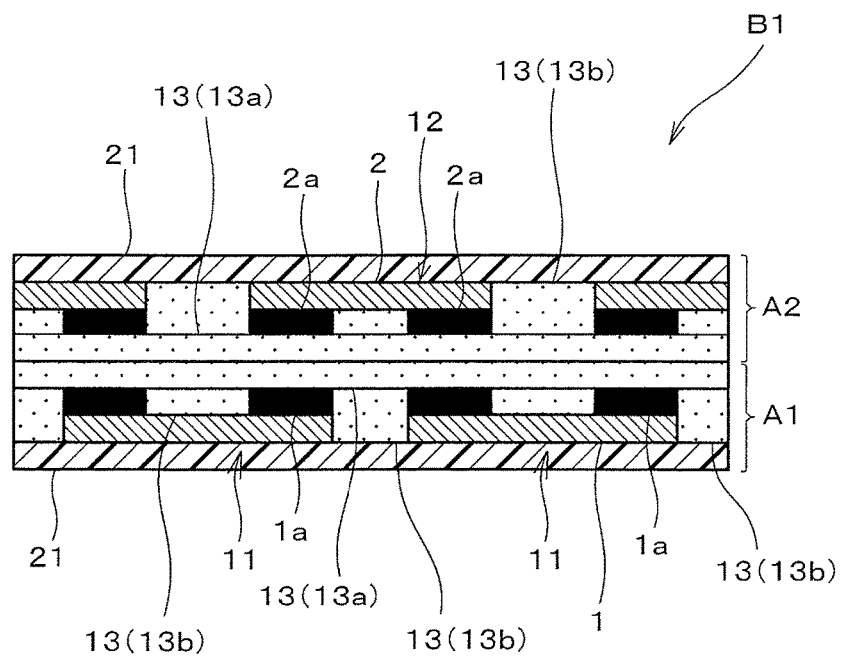
FIG. 7 is a view showing a positive electrode/negative electrode integrated sheet formed in one step of the method for manufacturing electrical storage device elements according to the example of the present invention.

1) As shown in FIG. 7, the positive electrode composite sheet A1 and the negative electrode composite sheet A2 are arranged so that the surfaces of the resin-containing insulating layers 13 (13a), each of which functions as a separator layer, face each other and are then heated while a pressure is uniformly applied from the two sides of the positive electrode composite sheet A1 and the negative electrode composite sheet A2 by pressure application plates to bond between the resin-containing insulating layers 13 (13a) each functioning as a separator layer and facing each other, so that the positive electrode/negative electrode integrated sheet B1 is formed.

In this step, the pressure applied by the pressure application plates is set to 20 MPa, the temperature of the pressure application plates is set to 150° C., and the application time is set to 30 seconds.

2) Next, after the positive electrode/negative electrode integrated sheet B1 is lifted up while the negative electrode layer 12 side thereof is sucked using a suction board (not shown), the base film (base film at the lower side in FIG. 7) 21 at the positive electrode layer side is peeled away.

Figure 8:
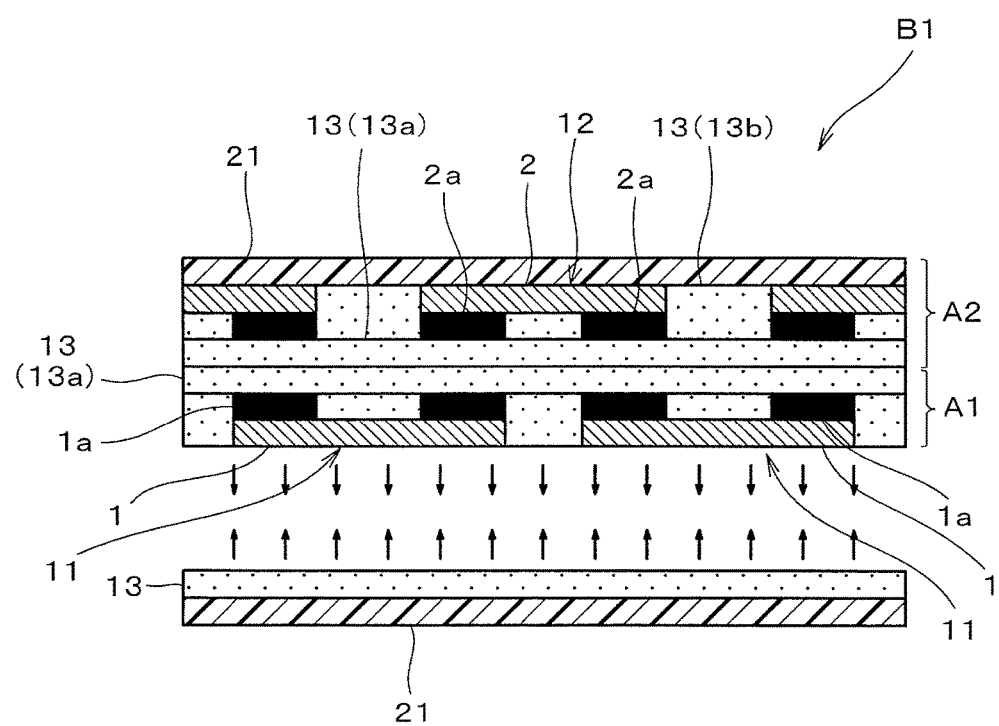
FIG. 8 is a view showing another step of the method for manufacturing electrical storage device elements according to the example of the present invention.

3) Subsequently, as shown in FIG. 8, a base film 21 on which a resin-containing insulating layer 13 having a thickness of 6 μm is formed is arranged so that the resin-containing insulating layer 13 is located at an upper side and so that the base film 21 is located at a lower side and is then bonded to the lower surface side of the positive electrode/negative electrode integrated sheet B1 from which the base film at the positive electrode side is peeled away in the step of the above 2).

Figure 9:
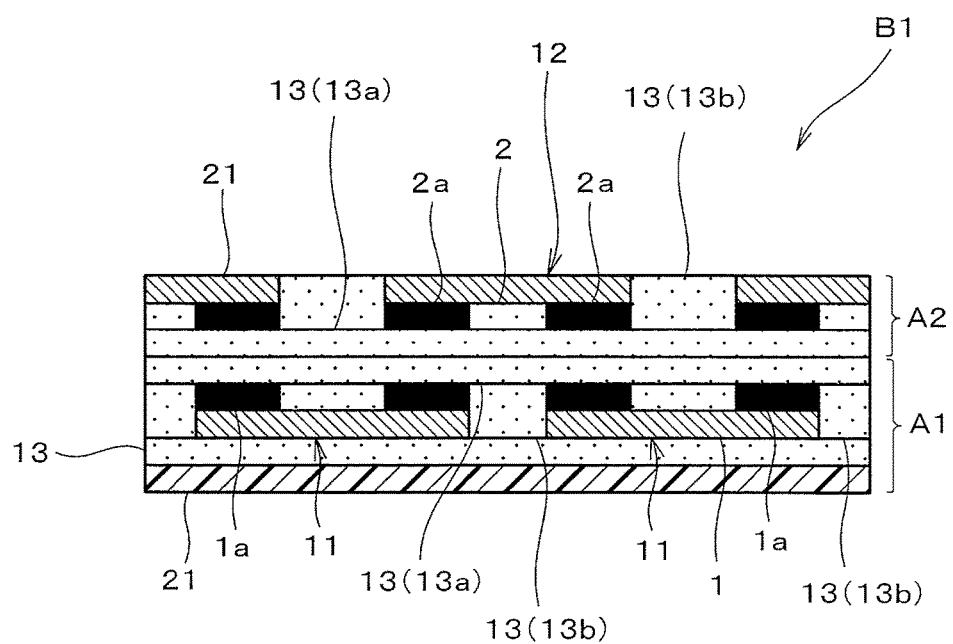
FIG. 9 is a view showing another step of the method for manufacturing electrical storage device elements according to the example of the present invention.

4) Next, as shown in FIG. 9, the base film (base film 21 at the upper side shown in FIG. 8) at the negative electrode side of the positive electrode/negative electrode integrated sheet B1 which is sucked by the suction board (not shown) in the step of the above 2) is peeled away.

5) Next, after another positive electrode/negative electrode integrated sheet B2 is lifted up while a positive electrode side thereof is sucked using a suction board (not shown), a base film (base film at a lower side) at a negative electrode layer 12 side is peeled away. In addition, the state of the positive electrode/negative electrode integrated sheet B2 after the base film at the lower side is peeled away is as that shown in FIG. 10.

Figure 10:
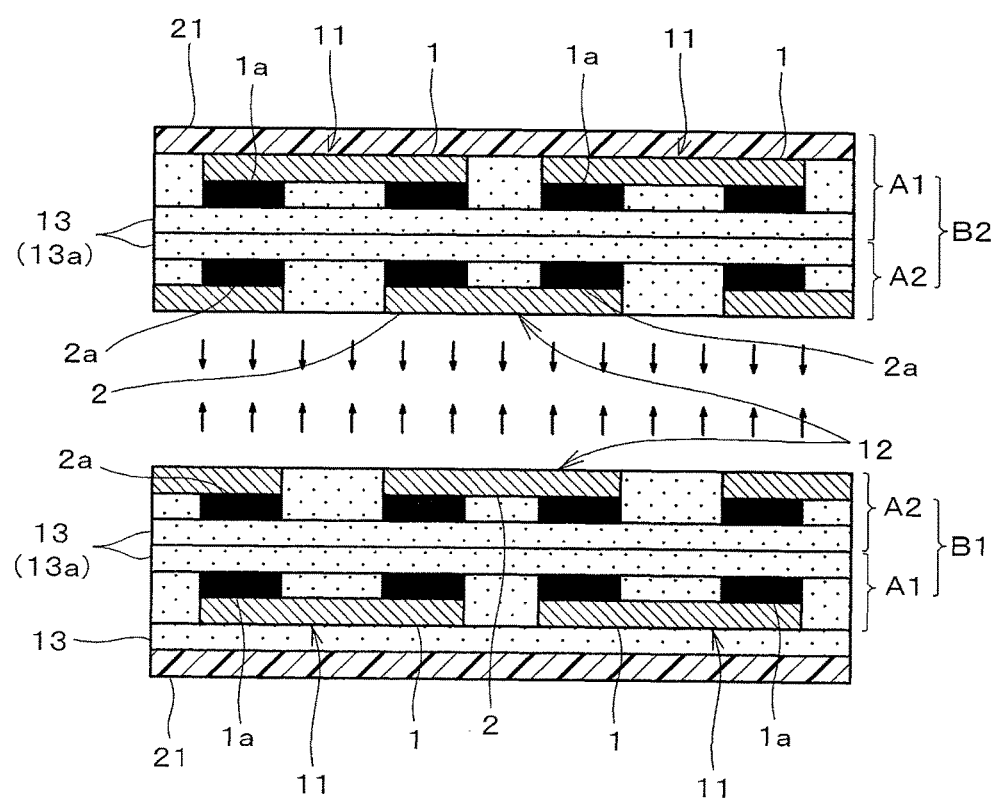
FIG. 10 is a view showing another step of the method for manufacturing electrical storage device elements according to the example of the present invention.
Figure 11:
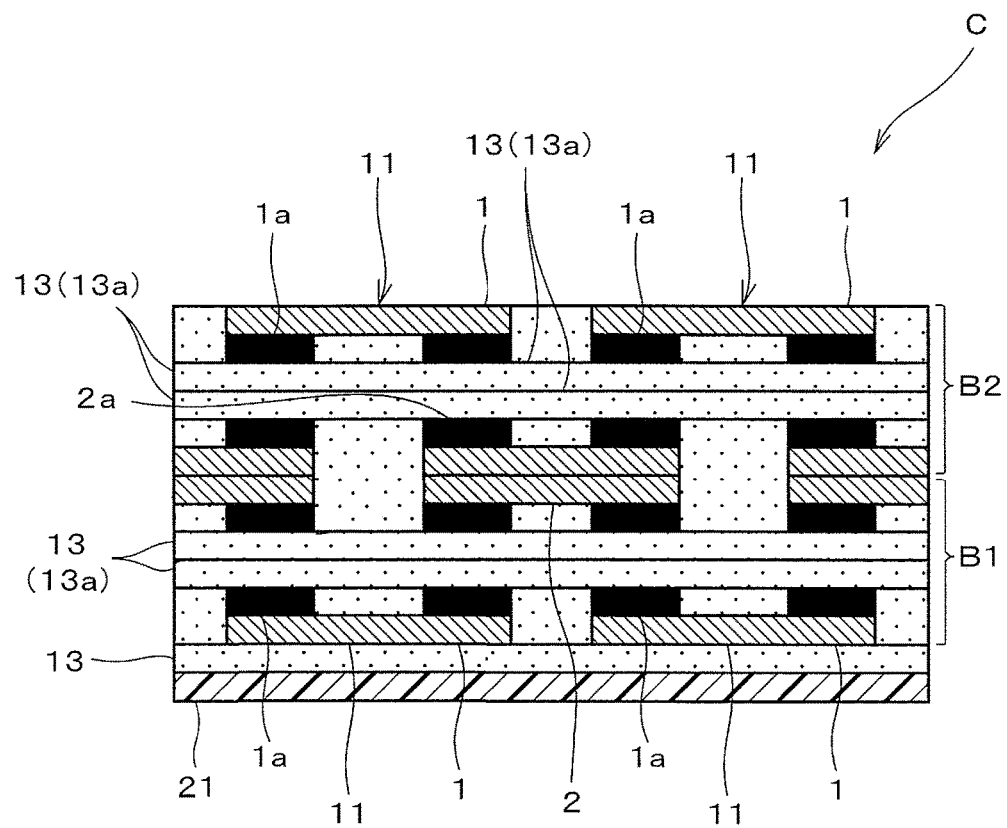
FIG. 11 is a view showing another step of the method for manufacturing electrical storage device elements according to the example of the present invention.

6) In addition, the positive electrode/negative electrode integrated sheet B1 on which the base film 21 provided with the resin-containing insulating layer 13 having a thickness of 6 μm is bonded at the lower surface side in the step of the above 3) and from which the base film at the upper side is peeled away in the step of the above 4) is arranged, as shown in FIG. 10, at the lower side of the positive electrode/negative electrode integrated sheet B2 from which the base film at the negative electrode layer 12 side (lower side) is peeled away in the step of the above 5) and is then bonded to the positive electrode/negative electrode integrated sheet B2 as shown in FIG. 11, so that a laminate structural body C is formed. This laminate structural body C is a structural body in which the two positive electrode/negative electrode integrated sheets B1 and B2 are laminated to each other so that the negative electrode sides thereof face each other.

7) Subsequently, still another positive electrode/negative electrode integrated sheet (not shown) from which a base film at a positive electrode side (lower surface side) is peeled away by suction of a negative electrode side using a suction board is arranged at and is then boned to the upper surface side (that is, on the positive electrode/negative electrode integrated sheet B2 forming the laminate structural body C) of this laminate structural body C so that the positive electrode side of the positive electrode/negative electrode integrated sheet B2 and the positive electrode side of the still another positive electrode/negative electrode integrated sheet (not shown) face each other.

8) Next, after the steps described above are repeatedly performed so that 100 positive electrode/negative electrode integrated sheets are laminated on a base film on which the resin-containing insulating layer is formed, the uppermost base film is peeled away.

9) Finally, after a sheet is separately prepared by forming only a resin-containing insulating layer having a thickness of 6 μm on a base film, a suction board is brought into contact with the base film side of the sheet described above, and the base film is then sucked so that the resin-containing insulating layer is bonded to the upper surface side (surface side at which the uppermost base film is peeled away) of the laminate structural body formed by lamination of 100 positive electrode/negative electrode integrated sheets in the step of the above 8), thereby forming a mother laminate (laminate to be formed by division into discrete laminates each forming the electrical storage device element of the present invention).

The bonding in the above steps is performed in such a way that after the resin-containing insulating layer is brought into contact with the positive electrode/negative electrode integrated sheet on the base film or the two positive electrode/negative electrode integrated sheets are brought into contact with each other, a pressure is uniformly applied to the entire surfaces by the plating application plates. The pressure applied by the pressure application plates is set to 20 MPa, the temperature of the pressure application plates is set to 150° C., and the application time is set to 30 seconds.

In addition, in this example, although the positive electrode collector layer and the negative electrode collector layer are each directly formed on the base film 21, as described above, after an adhesive layer is formed on the surface of the base film, the positive electrode layer and the negative electrode layer may be each formed on this adhesive layer.

In the case described above, in the lamination step in which the positive electrode/negative electrode integrated sheets B1 and B2 are laminated to each other, the positive electrode collectors or the negative electrode collectors are more reliably bonded to each other with the adhesive layers transferred to laminate structural member sides which are peeled away from the base films and are to be laminated to each other, and hence a laminate having a higher reliability can be formed.

Figure 12:
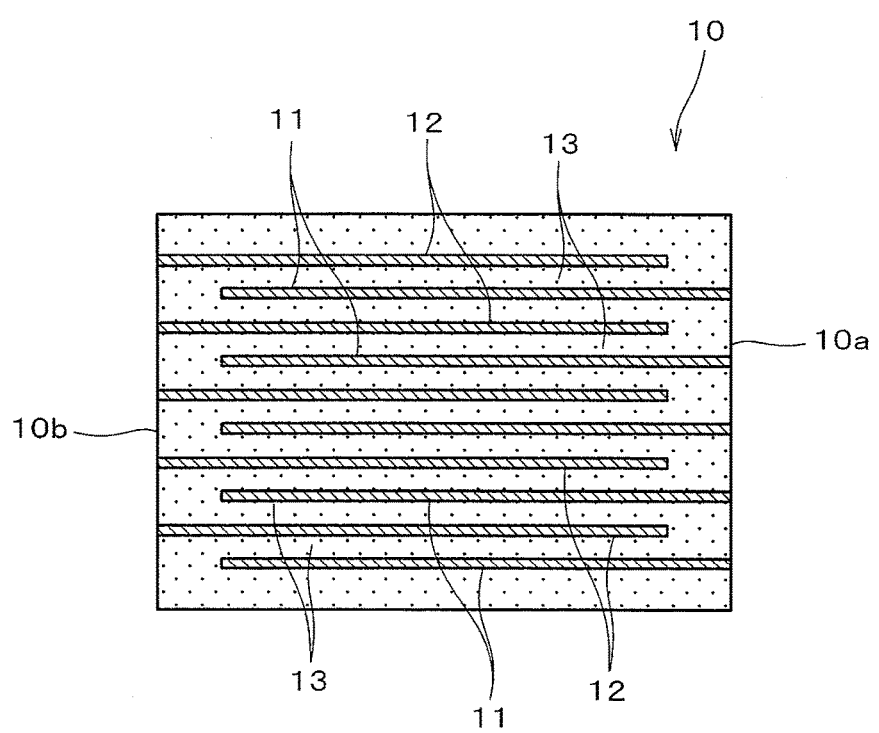
FIG. 12 is a front cross-sectional view schematically showing a laminate forming the electrical storage device element formed in the example of the present invention.
Figure 13:
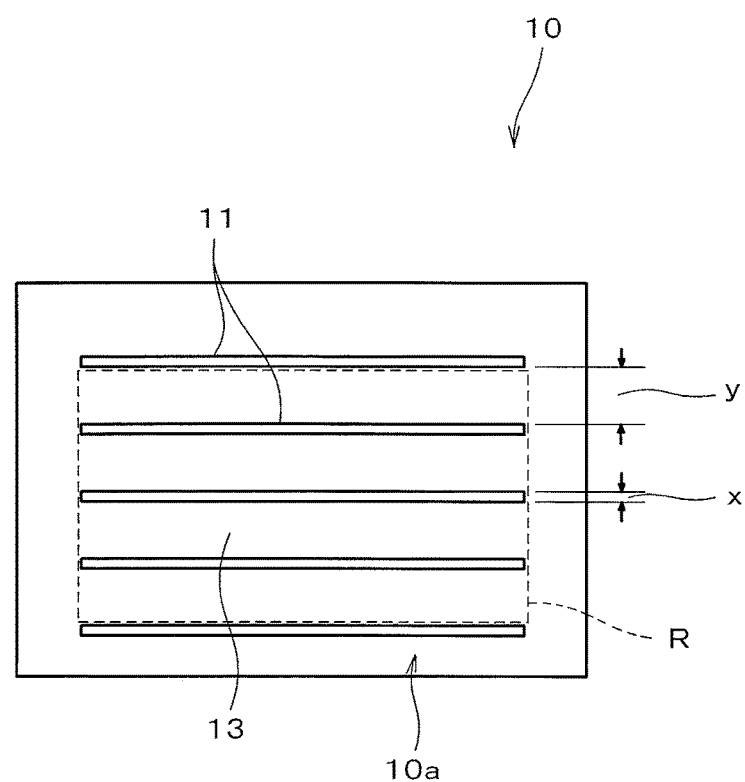
FIG. 13 is a view schematically showing an end surface of the laminate forming the electrical storage device element formed in the example of the present invention.

10) Next, after the base films bonded to the upper and the lower surfaces of the mother laminate (laminate formed by division into discrete laminates each forming the electrical storage device element of the present invention) formed as described above are peeled away, the mother laminate is cut at predetermined positions to form the laminates 10. FIG. 12 is a front cross-sectional view schematically showing the structure of the laminate 10, and FIG. 13 is a schematic view showing the structure of an end surface of the laminate 10.

In addition, in this example, when the resin-containing insulating layer 13 (13a) formed as the separator layer and the resin-containing insulating layer 13 (13b) formed as the filling layer are exposed to the end surfaces of the laminate 10, the resin-containing insulating layers thus exposed both function as the resin-containing insulating layers of the present invention.

Figure 14:
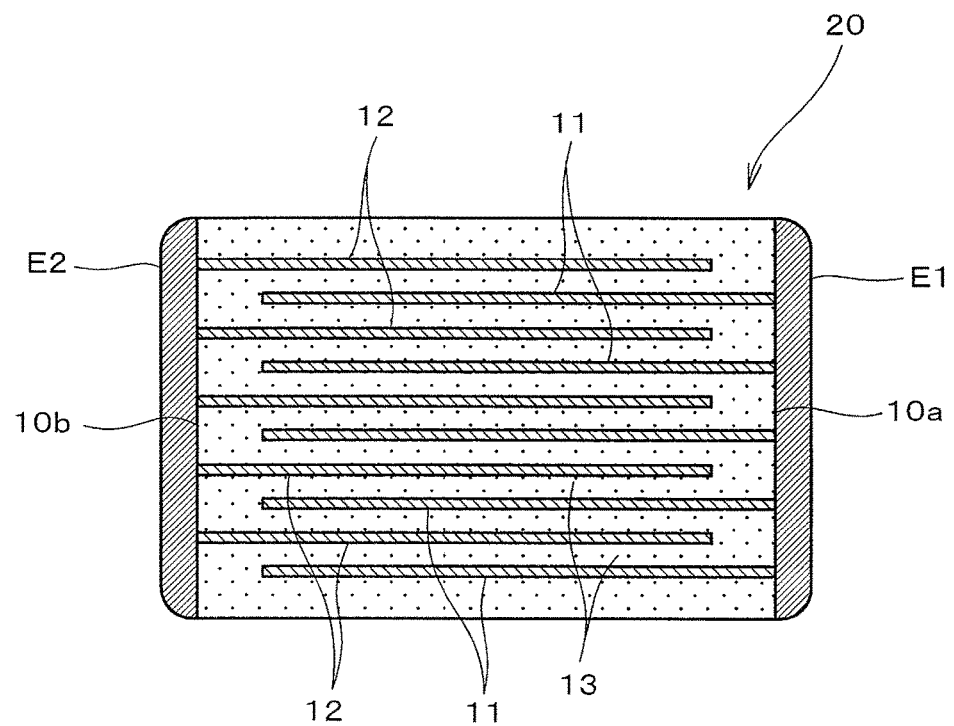
FIG. 14 is a front cross-sectional view schematically showing the structure of the electrical storage device element formed in the example of the present invention.

11) Subsequently, Al (aluminum) is arc-sprayed under the following conditions to the two end surfaces of the laminate to which the positive electrode collectors 1 and the negative electrode collectors 2 are exposed so as to form the sprayed end surface electrodes (Al end surface electrodes) E1 and E2 each having a thickness of 50 μm as shown in FIG. 14, so that the electrical storage device element 20 is formed.

<Arc Spray Conditions>
(a) Wire: Al (A1050), diameter: 1.2 mm
(b) Voltage: 30 V
(c) Current: 30 A
(d) Spray Distance: 100 mm
(e) Number of passes: 20 times In addition, in order to facilitate the understanding of the structures of the positive electrode layer 11 and the negative electrode layer 12, FIGS. 1 and 2 are each a schematic view in which the lamination number of the positive electrode layers 11 of the laminate 10 and that of the negative electrode layers 12 thereof are decreased, and hence the structure of the laminate 10 and that of the electrical storage device element 20 shown in FIGS. 12 to 14 look different from those described above; however, the laminate 10 and the electrical storage device element 20 shown in FIGS. 1 and 2 are the same as the laminate 10 and the electrical storage device element 20 shown in FIGS. 12 to 14.

In addition, in the other drawings, the individual portions are not accurately expanded nor contracted based on the actual dimensions, and because of the restriction of drawing and the convenience of understanding, the dimensions are appropriately changed and/or exaggerated.

[Evaluation of Properties]

(1) Observation of Formation State of Sprayed End Surface Electrodes

In this example, the formation state of the sprayed end surface electrodes E1 and E2 of the electrical storage device element (FIG. 14 (FIG. 1)) 20 formed as described above was investigated.

In investigation of the formation state of the sprayed end surface electrode E1 and E2, after electrical storage device elements (samples) were formed in such a way that exposed thicknesses (value of x (x1 and x2) in FIG. 13) of the collectors (positive electrode collector 1 and negative electrode collector 2) exposed to the end surfaces 10a and 10b of the laminate 10 were changed in a range of 0.1 μm to 4 μm as shown in Table 1 and an end-surface exposed thickness (value of y (y1 and y2) in FIG. 13) of the resin-containing insulating layers 13 was changed in a range of 7 μm to 40 μm as shown in Table 1, the formation state of the sprayed end surface electrodes E1 and E2 (FIG. 14 (FIG. 1)) was investigated.

In addition, in order to set the exposed thicknesses x (FIG. 13) of the positive electrode collector 1 and the negative electrode collector 2 exposed to the end surfaces 10a and 10b of the laminate 10 in a range of 0.1 μm to 4 μm, the positive electrode collector 1 and the negative electrode collector 2 themselves were each formed to have a thickness of 0.05 μm to 2 μm.

The reason the end-surface exposed thicknesses x of the positive electrode collector 1 and the negative electrode collector 2 are each two times the thickness of each of the positive electrode collector 1 and the negative electrode collector 2 is that when the positive electrode/negative electrode integrated sheets B1 and B2 are bonded (laminated) to each other in a manufacturing process, lamination is performed so that the positive electrode collectors 1 are bonded to each other or the negative electrode collectors 2 are bonded to each other.

In addition, in this example, when an Al film having a thickness of 0.05 μm to 2 μm (0.1 μm to 4 μm as the end-surface exposed thickness of the laminate) is formed, a film is formed from Al by a vacuum deposition method as described above, so that a collector (Al film) having a predetermined thickness is formed.

In addition, as the film formation conditions, the degree of vacuum, the current, the film formation rate, and the base cooling temperature were set to $3 \times 10^{-4}$ Pa, 800 mA, 30 Å/s, and −10° C., respectively.

In addition, the above method for forming an Al film is shown as one example of a method for forming an Al film, and for example, as described above, after a rolled foil having a thickness of 12 μm is pressure-bonded to a base film by a roll press, this foil may then be etched by hydrofluoric acid so as to form a collector (Al film) having a predetermined thickness.

In addition, the formation state of the sprayed end surface electrode of each sample (10 test pieces per sample) formed as described above was investigated. For the evaluation of the formation state of the sprayed end surface electrodes, among the positive electrode collectors and the negative electrode collectors exposed to the end surfaces, in a region other than a region which includes the uppermost and the lowermost collectors (uppermost and the lowermost positive electrode collectors 1 in FIG. 13) and which also includes the outside of the uppermost and the lowermost positive electrode collectors 1, that is, in a region (evaluation region) R shown in FIG. 13, the formation state of the sprayed end surface electrodes E1 and E2 (see FIG. 14) was observed.

The reason the region which includes the uppermost and the lowermost collectors and the outside thereof is regarded as a region not to be evaluated is that the influence of an external layer region on the region described above is taken into consideration.

In addition, based on the results obtained through the investigation of the formation state of the sprayed end surface electrode performed as described above, among 10 test pieces, when at least one test piece in which peeling and/or floating occurred in the above region (evaluation region) R was observed, although capable of improving the reliability as compared to that in the past, the sample was regarded as a slightly unfavorable sample and was evaluated as Δ.

In addition, a sample in which the sprayed end surface electrode was not adhered to the above region (evaluation region) R was regarded as a defective sample and was evaluated as x.

On the other hand, among 10 pieces, when all of them were free from peeling and floating in the above region (evaluation region), the sample was regarded as excellent and was evaluated as ○.

The results of the evaluation performed as described above are shown in Table 1. In addition, the evaluation results will be investigated later together with the evaluation of the bond resistance between the sprayed end surface electrode and the positive electrode collector or the negative electrode collector, which will be described later.

TABLE 1

| | | End-Surface Exposed Thickness x of Collector (μm) | | | | | | |
|---|---|---|---|---|---|---|---|---|
| | | 0.1 | 0.2 | 0.6 | 1.0 | 1.6 | 2.0 | 4.0 |
| Thickness y of Resin-Containing Insulating Layer (μm) | 40 | ○ | ○ | — | — | — | — | Δ |
| | 30 | ○ | ○ | ○ | ○ | ○ | ○ | Δ |
| | 25 | — | ○ | ○ | — | ○ | ○ | Δ |
| | 15 | — | — | — | — | ○ | Δ | Δ |
| | 10 | ○ | ○ | ○ | ○ | Δ | Δ | x |
| | 7 | — | — | — | Δ | — | — | — |

(2) Bond Resistance Between Sprayed End Surface Electrode and Positive Electrode Collector or Negative Electrode Collector In this example, samples in which the exposed thickness (the value of x shown in FIG. 13) of each of the positive electrode collector 1 and the negative electrode collector 2 exposed to the end surfaces was changed in a range of 0.1 to 2.0 were prepared (the exposed thickness (the value of y shown in FIG. 13) of the resin-containing insulating layer exposed to the end surface of the laminate was set constant to be 10 μm), and the bond resistance between the sprayed end surface electrode and one collector of each sample was measured, and a bond resistance per unit area was obtained from the bond resistance.

In addition, the cross-section of the sample was polished to expose a bond portion between the collector and the sprayed end surface electrode, and the bond resistance was measured by a four-terminal method using a measurement probe.

The results are shown in Table 2.

TABLE 2

| Thickness x of Collector (μm) | Bond Resistance ($\times 10^{-12}$ Ω · m$^2$) |
| --- | --- |
| 0.1 | 530 |
| 0.2 | 162 |
| 0.6 | 150 |
| 1.0 | 146 |
| 1.6 | 146 |
| 2.0 | 144 |

(3) Evaluation

As for the formation state of the sprayed end surface electrode, as shown in Table 1, when the exposed thickness (the value of x shown in FIG. 13) of the positive electrode collector or the negative electrode collector exposed to the end surface was 4 μm or more (x≥4 μm), peeling and floating of the sprayed end surface electrode were observed at any end-surface exposed thickness y of the resin-containing insulating layer.

In particular, when the end-surface exposed thickness of the resin-containing insulating layer was 10 μm, the sprayed end surface electrode was not adhered to the region (evaluation region) R, and it was confirmed that the evaluation was NG (x).

The reason for this is believed that when the thickness of the collector is excessively increased, peeling and floating of the sprayed end surface electrode are liable to be generated on the collector.

In addition, when the end-surface exposed thickness y of the resin-containing insulating layer was less than 25 μm, although some samples were evaluated as Δ (the case in which y was 15 μm and x was 2.0 μm, and the case in which y was 10 μm and x was 1.6 and 2.0 μm), approximately good results were obtained.

In addition, it has been believed that the bond between the sprayed end surface electrode and the collector is formed by a weak intermolecular force through an oxide film and/or a hydroxide film interposed therebetween and by an anchor effect, and hence compared to the bond between the insulating layer (resin-containing insulating layer) containing a resin and the sprayed end surface electrode, the bond between the sprayed end surface electrode and the collector is weak. Hence, it is believed that when the exposed ratio of the collector to the end surface of the laminate is decreased, since the contact area between the sprayed end surface electrode and the resin-containing insulating layer is increased, a high bond strength can be secured.

On the other hand, as for the bond resistance between the sprayed end surface electrode and the positive electrode collector or the negative electrode collector, as shown in Table 2, although the bond resistance between the sprayed end surface electrode and the collector was low, such as $162 \times 10^{-12}$ Ω·cm$^2$ or less, in the case of a sample in which the end-surface exposed thickness x of the collector was 0.2 to 2.0 μm, it was confirmed the bond resistance between the sprayed end surface electrode and the collector was unfavorably high, such as $530 \times 10^{-12}$ Ω·cm$^2$, in the case of a sample in which the end-surface exposed thickness of the collector was 0.1 μm.

Accordingly, in the case of the sample in which the end-surface exposed thickness x of the collector was 0.1 μm, it was found that although no peeling nor floating were generated on the collector as shown in Table 1, the bond resistance was unfavorably increased.

In addition, it was confirmed that when the end-surface exposed thickness y of the resin-containing insulating layer was 7 μm or less, a short circuit was unfavorably generated between the active material layers.

In addition, when the end-surface exposed thickness y of the resin-containing insulating layer is 40 μm or more, since the thickness of the electrical storage device element is increased, it is not preferable in terms of reduction in size and height of the device.

From the results described above, in order to obtain an electrical storage device element including a sprayed end surface electrode which has a low bond resistance to a collector and which is excellent in bond reliability to an end surface of a laminate, it is found that the relationship between the end-surface exposed average thickness x1 of the positive electrode collectors and the end-surface exposed average thickness y1 of the resin-containing insulating layers preferably satisfies requirements represented by the following expressions (1), (2), and (3), and that the relationship between the end-surface exposed average thickness x2 of the negative electrode collectors and the end-surface exposed average thickness y2 of the resin-containing insulating layers preferably satisfies requirements represented by the following expressions (4), (5), and (6).

$$0.2 \; \mu m \leq x1 \leq 2.0 \; \mu m \quad (1)$$

$$10 \; \mu m \leq y1 \leq 30 \; \mu m \quad (2)$$

$$y1 \geq 15x1 - 5 \quad (3)$$

$$0.2 \; \mu m \leq x2 \leq 2.0 \; \mu m \quad (4)$$

$$10 \; \mu m \leq y2 \leq 30 \; \mu m \quad (5)$$

$$y2 \geq 15x2 - 5 \quad (6)$$

In addition, in the present invention, the case in which the relationship between the average thickness x1 of the positive electrode collectors and the average thickness y1 of the resin-containing insulating layers and the relationship between the average thickness x2 of the negative electrode collectors and the average thickness y2 of the resin-containing insulating layers satisfy the above requirements indicates that in regions other than regions which include the uppermost and the lowermost positive and negative electrode collectors (the uppermost and the lowermost positive electrode collectors 11 in FIG. 13) exposed to predetermined end surfaces and which include the outside of the uppermost and the lowermost positive and negative electrode collectors, that is, in the evaluation region R of FIG. 13, the relationship between x1 and y1 and the relationship between x2 and y2 satisfy the requirements represented by the above expressions (1), (2), (3), (4), (5), and (6).

The reason the relationship between x1 and y1 and the relationship between x2 and y2 in the above limited regions are set to the requirements is that the influence of the external layer region on the region which includes the outermost and the lowermost collectors and the outside thereof is taken into consideration.

[Formation of Electrical Double Layer Capacitor Using Electrical Storage Device Element]

Next, a method for forming an electrical double layer capacitor as an electrical storage device formed from the electrical storage device element (electrical double layer capacitor element) formed as described above will be described.

First, on the pair of the sprayed end surface electrodes E1 and E2 of the electrical storage device element (electrical double layer capacitor element) 20 (see FIGS. 1, 2, and 14) which is formed as described above and which includes on the two end surfaces, the sprayed end surface electrodes electrically connected to the positive electrode collectors 1 and the negative electrode collectors 2, the electrically conductive adhesives 42 containing gold as electrically conductive particles are applied by dipping, and the electrical storage device element 20 is received and arranged in the package 41 so that the electrically conductive adhesives 42 are connected to the positive electrode package electrode 41a and the negative electrode package electrode 41b.

Next, the package 41 in which the electrical storage device element 20 is received and arranged is heated at 170° C. for 10 minutes to cure the electrically conductive adhesives 42, so that the sprayed end surface electrodes E1 and E2 of the electrical storage device element 20 are fixed to and also electrically connected to the positive electrode package electrodes 41a and the negative electrode package electrode 41b, respectively.

Next, as the electrolytic solution (electrolyte) 31, after 1-ethyl-3-methylimidazorium tetrafluoroborate is charged into the package 41, the package 41 is air-tightly sealed.

Accordingly, a highly reliable electrical storage device (electrical double layer capacitor) 50 in which the sprayed end surface electrodes E1 and E2 are reliably bonded to the end surfaces 10a and 10b of the laminate 10 can be obtained.

In addition, an electrical double layer capacitor using a solution containing 1 mol/l of triethylmethylammonium tetrafluoroborate dissolved in propylene carbonate as the electrolytic solution may also be formed.

In addition, in the example described above, although the positive electrode collectors 1 and the negative electrode collectors 2 are exposed, respectively, to the end surfaces 10a and 10b, which face each other, of the laminate 10, and the sprayed end surface electrodes E1 and E2 are formed, respectively, on the facing end surfaces 10a and 10b, the positive electrode collectors and the negative electrode collectors may be extended to predetermined regions of one end surface, and a pair of sprayed end surface electrodes may be formed on this one end surface.

Example 2

Electrical storage device elements (electrical double layer capacitor elements) and electrical storage devices (electrical double layer capacitors) were formed using 6 types of resin materials shown in Table 3 as a resin material (binder component) forming the resin-containing insulating layer under the condition in which the end-surface exposed thickness x of the collector in Table 1 was 2.0 μm and the end-surface exposed thickness of the resin-containing insulating layer was 25 μm (condition 1) and under the condition in which the end-surface exposed thickness x of the collector in Table 1 was 1.0 μm and the end-surface exposed thickness of the resin-containing insulating layer was 10 μm (condition 2), and the formation state of the sprayed end surface electrode was investigated (10 test pieces per sample).

In addition, in this example 2, as the binder component (resin material), as shown in Table 3, resin materials having different glass transition temperatures in a range of 275° C. to −123° C. were used.

In addition, when a binder solution was formed, a solvent was appropriately selected in accordance with the binder component (resin material).

In addition, in this example, as the sprayed end surface electrode, sprayed end surface electrodes having thicknesses of 50 and 100 μm were formed.

In addition, the formation state of the sprayed end surface electrode was evaluated as described below.

A sample was regarded as good and evaluated as ○ in the case in which when a sprayed end surface electrode having a thickness of 50 μm was formed, although peeling and floating of the sprayed end surface electrode were not generated in the evaluation region R (see FIG. 13) which was the same as that in Example 1, floating of a sprayed end surface electrode having a thickness of 100 μm was generated.

In addition, a sample was regarded as significantly good and evaluated as ⊙ in the case in which when a sprayed end surface electrode having a thickness of 50 μm was formed, peeling and floating of the sprayed end surface electrode were not generated in the evaluation region R (see FIG. 13), and peeling and floating of a sprayed end surface electrode having a thickness of 100 μm were also not generated.

The results are shown in Table 3.

TABLE 3

| Binder | Tg (° C.) | Formation State of Sprayed End Surface Electrode | |
|---|---|---|---|
| | | Condition 1 x = 2.0 μm y = 25 μm | Condition 2 x = 1.0 μm y = 10 μm |
| Poly(amide imide) | 275 | ○ | ○ |
| Polytetrafluoroethylene | 126 | ○ | ○ |
| Urethane | −20 | ⊙ | ⊙ |
| PVDF-HFP | −35 | ⊙ | ⊙ |
| PVDF | −40 | ⊙ | ⊙ |
| Silicone | −123 | ⊙ | ⊙ |

As shown in Table 3, when a poly(amide imide) resin and a polytetrafluoroethylene resin, each of which had a glass transition temperature of more than −20° C., were used as the binder component, although floating of a sprayed end surface electrode having a thickness of 100 μm was generated (that is, evaluation results was ○), when resins (urethane, PVDF-HFP, PVDF, and silicone), each of which had a glass transition temperature of −20° C. or less, were used as the binder component, even in the case of a sprayed end surface electrode having a thickness of 100 μm, peeling and floating were not observed, and the evaluation result was significantly good and ranked as ⊙.

The reason for this is that when a resin material having a glass transition temperature of −20° C. or less is used, since the resin forming the resin-containing insulating layer is likely to be deformed, sprayed particles are driven into the resin when the sprayed particles collide against the resin-containing insulating layer exposed to the end surface of the laminate, and as a result, the bond strength is improved by an anchor effect.

Example 3

In this example 3, in order to further reliably bond the sprayed end surface electrode to the end surface of the laminate by increasing the bond area between the sprayed end surface electrode and the end surface of the laminate, as shown in FIGS. 15(a) and 15(b) and FIGS. 16(a) and 16(b), concave portions 21 were formed in the two end surfaces of the laminate 10, and sprayed end surface electrodes E each having a thickness of 300 μm were formed on the end surfaces so as to cover the concave portions 21. In addition, the thickness of a portion of the sprayed end surface electrode formed on a side surface of the concave portion 21 was smaller than the thickness of the sprayed end surface electrode formed on the end surface.

In addition, as the other conditions, the end-surface exposed thickness x of the collector in Table 1 was set to 1.0 μm, and the end-surface exposed thickness y of the resin-containing insulating layer was set to 30 μm.

In addition, in FIGS. 15(a) and 15(b) and FIGS. 16(a) and 16(b), although one end surface 10a to which the positive electrode collectors 1 are exposed is only shown, concave portions similar to those formed in the end surface 10a were also formed in the other end surface which is not shown (corresponding to 10b shown in FIGS. 1 and 14), and a sprayed end surface electrode was formed so as to cover the above concave portions.

When the concave portions described above were formed, a resin-containing insulating paste was printed to have a predetermined pattern, so that the concave portions were formed. In addition, various known types of methods, such as dry blast and wet blast, may also be used.

Figure 15:
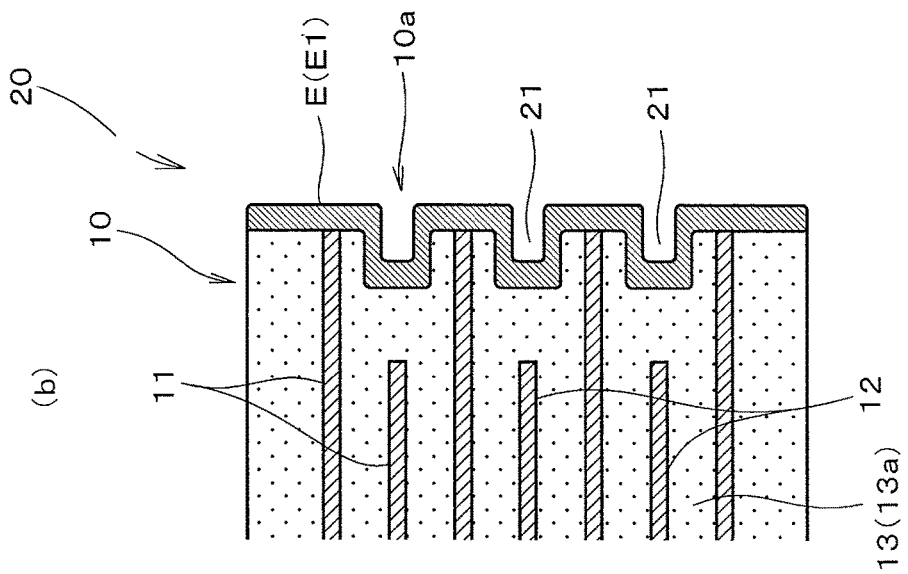
FIG. 15 includes views each showing a modified example of the electrical storage device element of the present invention, (a) is a view schematically showing the structure of the end surface of the laminate, and (b) is a front cross-sectional view schematically showing the state in which a sprayed end surface electrode is formed on the end surface of the laminate.
Figure 15:
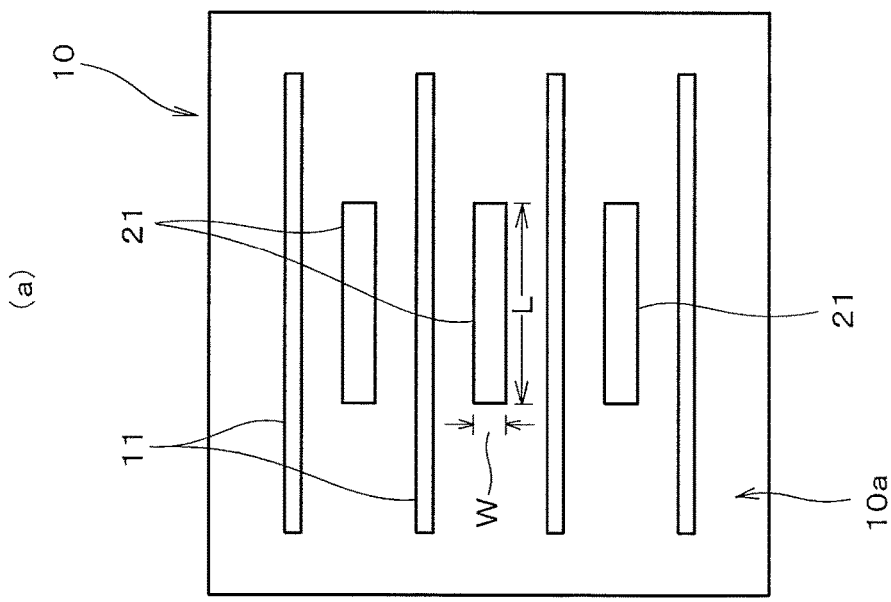

In addition, in the structure shown in FIGS. 15(a) and 15(b), at positions of the two end surfaces of the laminate 10 located between the positive electrode collectors 1 and between the negative electrode collectors 2, concave portions 21 having a length (L) of 1 mm, a width (W) of 20 μm, and a depth of 1 mm are formed (only one end surface 10a side is shown in FIGS. 15(a) and 15(b)), and the sprayed end surface electrodes E are formed so as to cover the concave portions 21 (only E1 at the one end surface 10a side is shown in FIG. 15(b)). In addition, although the sprayed end surface electrode E (E1) is formed so as to cover the concave portions 21, the concave portions 21 are not fully filled, and the surface of the sprayed end surface electrode E1 has concave portions corresponding to the shape of the concave portions 21.

Figure 16:
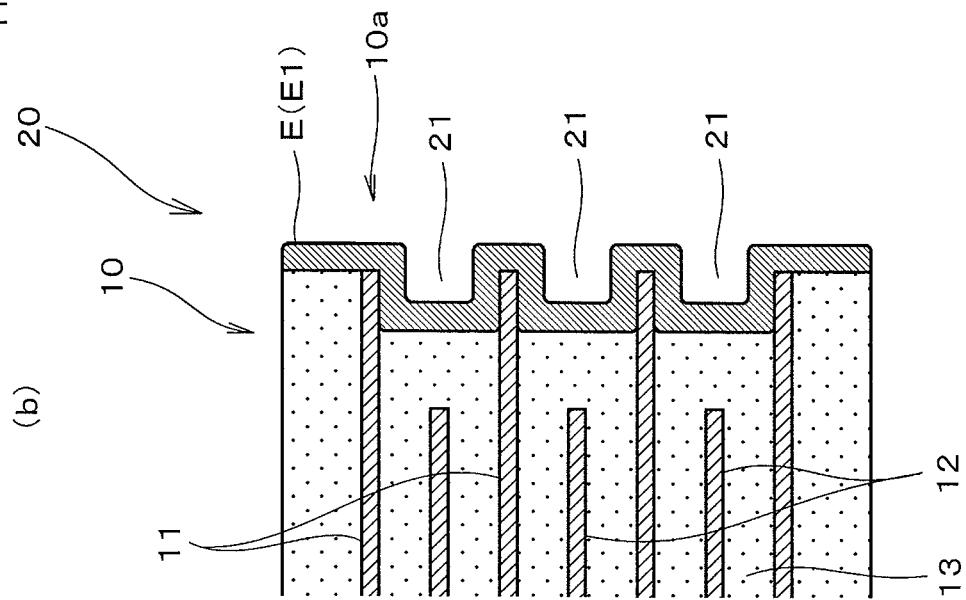
FIG. 16 includes views each showing another modified example of the electrical storage device element of the present invention, (a) is a view schematically showing the structure of the end surface of the laminate, and (b) is a front cross-sectional view schematically showing the state in which the sprayed end surface electrode is formed on the end surface of the laminate.
Figure 16:
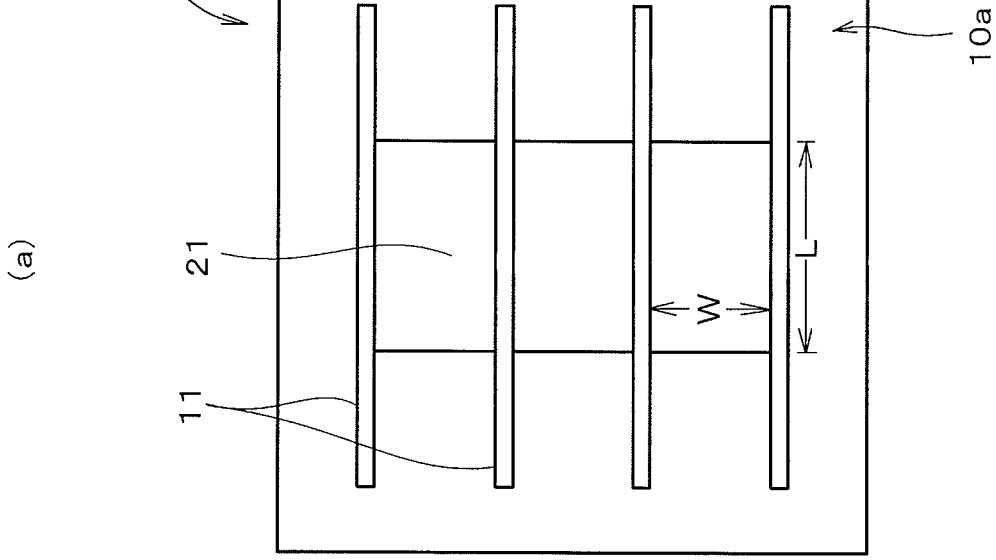

In addition, in the structure shown in FIGS. 16(a) and 16(b), the concave portion 21 is formed from the position at which an upper-side positive electrode collector 1 of the laminate 10 is arranged to the position at which a lower-side positive electrode collector 1 is arranged, and the concave portion 21 is divided by the positive electrode collectors 1 into three segments (only one end surface 10a side is shown in FIGS. 16(a) and 16(b)).

In addition, the segmented concave portions 21 each have a length (L) of 1 mm, a width (W) of 30 μm, and a depth of 1 mm. In addition, the resin-containing insulating layer 13 provided around two positive electrode collectors 1 located at a central portion in a top-to-bottom direction is partially removed, and the concave portion 21 is formed in the end surface 10a of the laminate 10 so that the positive electrode collectors 1 protrude from the bottom surface of the concave portion 21 (only one end surface 10a side is shown in FIG. 16(b)).

In addition, the sprayed end surface electrode E is formed (only E1 at the one end surface 10a side is shown in FIG. 16(b)) so as to cover the bottom surface of the concave portion 21 and also so as to cover the positive electrode collectors 1 protruding from the bottom surface (two positive electrode collectors 1 located at the central portion in the top-to-bottom direction shown in FIGS. 16(a) and 16(b)) and the positive electrode collectors 1 exposed to the side surfaces of the concave portion 21 (two positive electrode collectors 1 located at an upper side and a lower side shown in FIGS. 16(a) and 16(b)).

In addition, in the example shown in FIGS. 16(a) and 16(b), although the sprayed end surface electrode E (E1) is formed so as to cover the concave portion 21, the concave portion 21 is not fully filled, and the surface of the sprayed end surface electrode E has concave portions 21 and also has concave portions so as to correspond to the shapes of the positive electrode collectors 1 protruding from the bottom surface of the concave portion 21.

Furthermore, except that the concave portions were not formed in the end surfaces of the laminate, and the end surfaces were formed flat, a sample in which sprayed end surface electrodes each having a thickness of 300 μm were formed on two end surfaces was formed under the same conditions as those in the case shown in FIGS. 15(a) and 15(b) and FIGS. 16(a) and 16(b).

In addition, as for the samples in which the concave portions were not formed in the end surfaces of the laminate and the samples shown in FIGS. 15(a) and 15(b) and FIGS. 16(a) and 16(b), the formation state of the sprayed end surface electrode was investigated, that is, the bond resistance between the sprayed end surface electrode and the collector and the presence of peeling and floating of the sprayed end surface electrode or the generation state thereof were investigated.

The results are shown in Table 4.

TABLE 4

| End-Surface Structure | Bond Resistance ($\times 10^{-12}$ $\Omega \cdot m^2$) | Formation State of 300 μm-thick Sprayed End Surface Electrode |
|---|---|---|
| Flat | 150 | Generation of Floating |
| Formation of Concave Portions (No Protrusion of Collector) | 148 | No Peeling and No Floating (No peeling and no floating are observed even when a 350 μm-thick sprayed end surface electrode is formed.) |
| Formation of Concave Portion/Protrusion of Collectors from Bottom Surface of Concave Portion | 73 | No Peeling and No Floating (However, floating is generated when a 350 μm-thick sprayed end surface electrode is formed.) |

As shown in Table 4, in the case of the sample in which the concave portions were not formed in the end surfaces of the laminate, although an excellent bond resistance of $150 \times 10^{-12}$ $\Omega \cdot cm^2$ was obtained when the sprayed end surface electrode had a thickness of 300 μm, slight floating was observed.

On the other hand, in the case of the sample shown in FIGS. 15(a) and 15(b) in which although a plurality of concave portions was formed in the end surface of the laminate, no collectors were allowed to protrude from the bottom surfaces of the concave portions of the laminate, the bond resistance was excellent, such as $148 \times 10^{-12}$ $\Omega \cdot cm^2$, and no peeling and no floating were observed not only when the thickness of the sprayed end surface electrode was 300 μm but also when the thickness thereof was 350 μm.

In addition, in the case of the sample shown in FIGS. 16(a) and 16(b) in which the concave portion was formed in the end surface of the laminate and the collectors were allowed to protrude from the bottom surface of the concave portion, the bond resistance was sufficiently excellent, such as $73 \times 10^{-12}$ $\Omega \cdot cm^2$, and peeling and floating of a sprayed end surface electrode having a thickness of 300 μm were not observed. However, when the thickness of the sprayed end surface electrode was increased to 350 μm, slight floating was observed.

The reason for this is that in the structure shown in FIGS. 15(a) and 15(b) and the structure shown in FIGS. 16(a) and 16(b), since the concave portions are formed in the end surfaces of the laminate, the contact area between the sprayed end surface electrode and the resin-containing insulating layer forming the end surface of the laminate is increased, and as a result, the bond strength of the sprayed end surface electrode to the end surface of the laminate is improved.

In addition, as shown in FIGS. 16(a) and 16(b), when the positive electrode collectors are allowed to protrude from the bottom surface of the concave portion, besides an increase in contact area between the sprayed end surface electrode and the resin-containing insulating layer forming the end surface of the laminate, since the contact area between the sprayed end surface electrode and the collector is also increased, the generation of peeling and floating of the sprayed end surface electrode can be more reliably suppressed, and in addition, by decreasing the bond resistance between the sprayed end surface electrode and the collector, a decrease in resistance of the electrical storage device can also be realized.

In addition, as the examples shown in FIGS. 15(a) and 15(b) and FIGS. 16(a) and 16(b), when the sprayed end surface electrode is formed on the end surface of the laminate so as to have a surface having at least one concave portion corresponding to the shape of the end surface of the laminate in which at least one concave portion is formed, since the sprayed end surface electrode has a structure bent along the shape of the end surface of the laminate, an internal stress of the sprayed end surface electrode is suppressed and reduced from being transmitted by the presence of the bent portion described above, and as a result, the warpage and peeling of the sprayed end surface electrode can be suppressed.

In addition, in the individual examples described above, although the electrical double layer capacitor has been described by way of example as the electrical storage device, the electrical storage device to which the present invention is applied is not limited to the electrical double layer capacitor, and the present invention may also be applied, for example, to a lithium ion secondary battery and a lithium ion capacitor.

For example, when an electrode in which a mixture layer containing a lithium composite oxide, such as $LiCoO_2$, is provided on an aluminum foil is used as a positive electrode, an electrode in which a mixture layer containing graphite is provided on a copper foil is used as a negative electrode, and a solution in which 1 mol/L of $LiPF_6$ is dissolved in a mixed solvent of ethylene carbonate and diethyl carbonate is used an electrolyte, a lithium ion secondary battery can be formed.

In addition, for example, when an electrode in which a mixture layer containing active carbon is provided on an aluminum foil is used as a positive electrode, an electrode in which a mixture layer containing graphite is provided on a copper foil is used as a negative electrode, and a solution in which 1 mol/L of $LiPF_6$ is dissolved in a mixed solvent of ethylene carbonate and diethyl carbonate is used an electrolyte, a lithium ion capacitor can be formed.

In addition, the present invention is not limited to the above examples, and particular structures of the positive electrode and the negative electrode, the formation methods and constituent materials of the positive electrode and the negative electrode, the composition of materials forming the resin-containing insulating layer, the types of resins contained in the resin-containing insulating layer, particular structures of the laminate functioning as an electrical storage component (lamination mode of the positive electrode, the negative electrode, and the resin-containing insulating layer, the number of lamination layers, and the like), the types of electrolytes (electrolytic solutions), particular formation methods of the laminate, and the like may be variously modified and changed without departing from the scope of the present invention.

Figure 17:
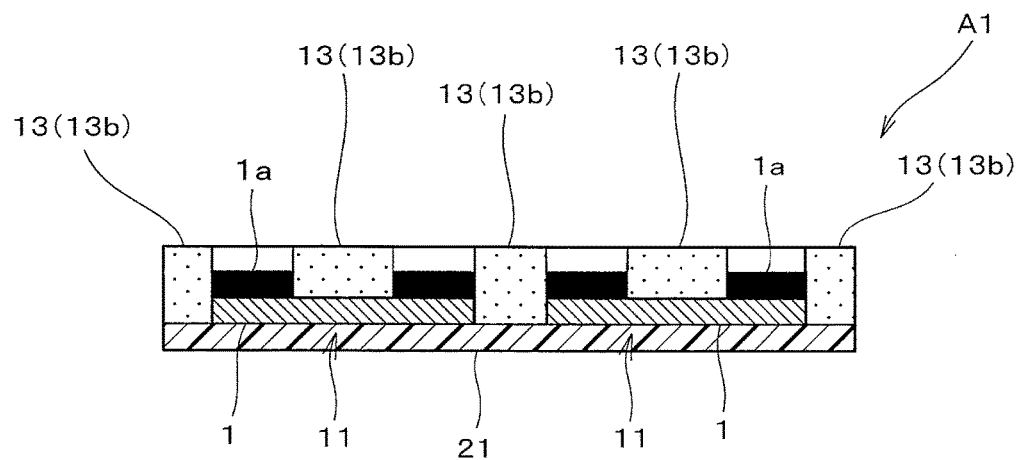
FIG. 17 is a view showing another example of the positive electrode composite sheet which may be formed in one step of the method for manufacturing electrical storage device elements of the present invention.
Figure 18:
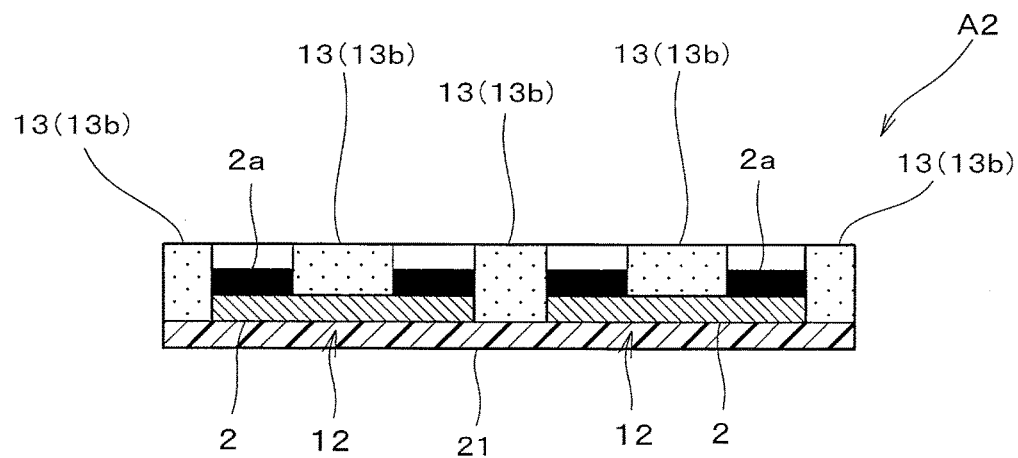
FIG. 18 is a view showing another example of the negative electrode composite sheet which may be formed in one step of the method for manufacturing electrical storage device elements of the present invention.

For example, a positive electrode composite sheet and a negative electrode composite sheet which correspond to the positive electrode composite sheet and the negative electrode composite sheet shown in FIGS. 5 and 6 formed in the above example may be formed to have the structures as shown in FIGS. 17 and 18.

In addition, in a positive electrode composite sheet A1 shown in FIG. 17, the resin-containing insulating layer functioning as a separator layer is not formed on the positive electrode active materials 1a, and the resin-containing insulating layer (filling layer) 13 (13b) is formed only around the positive electrode active materials 1a.

In addition, in a negative electrode composite sheet A2 shown in FIG. 18, the resin-containing insulating layer functioning as a separator layer is not formed on the negative electrode active materials 2a, and the resin-containing insulating layer (filling layer) 13 (13b) is formed only around the negative electrode active materials 2a.

Figure 19:
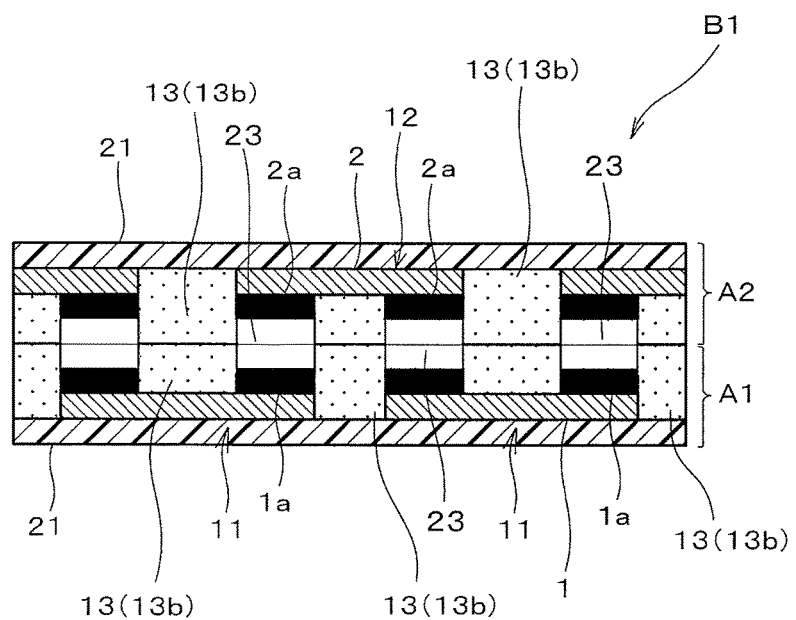
FIG. 19 is a view showing a positive electrode/negative electrode integrated sheet formed using the positive electrode composite sheet shown in FIG. 17 and the negative electrode composite sheet shown in FIG. 18.

In addition, when a positive electrode/negative electrode integrated sheet corresponding to the positive electrode/negative electrode integrated sheet B1 of the above example shown in FIG. 7 is formed using the positive electrode composite sheet A1 shown in FIG. 17 and the negative electrode composite sheet A2 shown in FIG. 18, a positive electrode/negative electrode integrated sheet B1 having the structure as shown in FIG. 19 is obtained.

In the positive electrode/negative electrode integrated sheet B1 shown in FIG. 19, the resin-containing insulating layer 13 (13a) functioning as a separator is not provided between the positive electrode active materials 1a and the negative electrode active materials 2a unlike the case of the positive electrode/negative electrode integrated sheet B1 shown in FIG. 7, and voids 23 are formed therebetween; however, by the resin-containing insulating layer (filling layer) 13 (13b) formed around the voids 23, the lamination structure is maintained while the voids 23 are provided between the positive electrode active materials 1a and the negative electrode active materials 2a.

Figure 20:
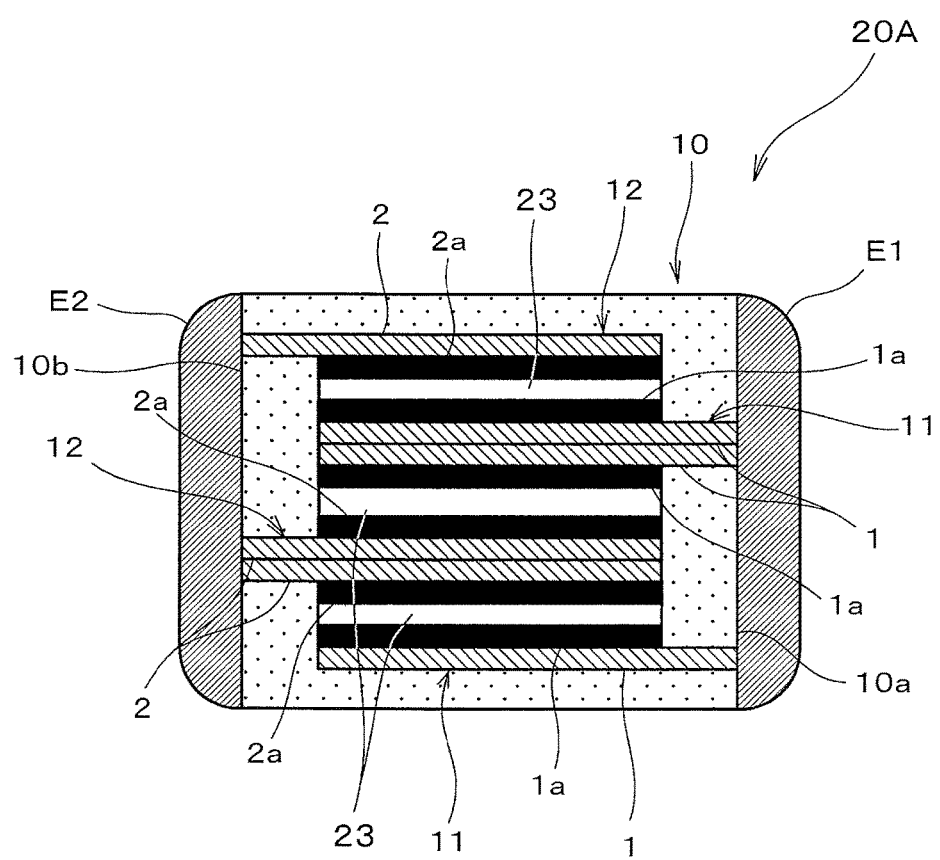
FIG. 20 is a front cross-sectional view showing an electrical storage device element (electrical double layer capacitor element) formed using the positive electrode/negative electrode integrated sheets shown in FIG. 19.

In addition, when a plurality of the positive electrode/negative electrode integrated sheets B1 as described above is formed, and an electrical storage device element (electrical double layer capacitor element) is formed by a method similar to that of the above example 1 using the positive electrode/negative electrode integrated sheets B1 thus formed, an electrical double layer capacitor element 20A as shown in FIG. 20 in which the separator layer (the resin-containing insulating layer functioning as the separator layer) is not provided between the positive electrode active materials 1a and the negative electrode active materials 2a is obtained. In addition, in the void 23 between the positive electrode active material 1a and the negative electrode active material 2a, the electrolyte is to be maintained.

The electrical storage device 50 formed as described above is also included in the scope of the present invention, and the operation and effect similar to that of the electrical double layer capacitor element 20 of the above example 1 can be obtained. Furthermore, in the electrical double layer capacitor element 20A, since the separator is not provided between the positive and negative active materials, the reduction in resistance can be achieved.

In addition, in FIGS. 17 to 20, the portions designated by the same reference numerals as those in FIGS. 1, 5, 6, and 7 indicate the identical or corresponding portions.

In addition, as is the case of the other drawings, in FIGS. 17 to 20, the individual portions are not accurately expanded nor contracted based on the actual dimensions, and because of the restriction of drawing and the convenience of understanding, the dimensions are appropriately changed and/or exaggerated.

In addition, in FIGS. 17 to 20, although the mode in which the separator layers are not provided on the positive electrode active material 1a and the negative electrode active material 2a has been described, the present invention is not limited thereto. In the mode shown in FIGS. 17 to 20, for example, separator layers each having a shape in which a plurality of columnar insulating members are dispersed and arranged may be formed on the positive electrode active material 1a and the negative electrode active material 2a so that the positive electrode active material 1a and the negative electrode active material 2a are not in contact with each other, and in the case described above, a leak current can be more reliably suppressed.

REFERENCE SIGNS LIST 1 positive electrode collector
1a positive electrode active material
2 negative electrode collector
2a negative electrode active material
10 laminate
10a, 10b end surface
11 positive electrode layer
12 negative electrode layer
13 (13a) resin-containing insulating layer (separator layer)
13 (13b) resin-containing insulating layer (filling layer)
20, 20A electrical storage device element (electrical double layer capacitor element)
21 base film
23 void
31 electrolyte (electrolytic solution)
41 package
41a positive electrode package electrode
41b negative electrode package electrode
42 electrically conductive adhesive
50 electrical storage device (electrical double layer capacitor)
141a package main body
141b lid member
A1 positive electrode composite sheet
A2 negative electrode composite sheet
B1, B2 positive electrode/negative electrode integrated sheet
C laminate structural body
E, E1, E2 sprayed end surface electrode

The invention claimed is:

1. An electrical storage device element comprising:
a laminate having:
a first end surface,
a second end surface opposing the first end surface,
a plurality of positive electrode layers alternating with a plurality of negative electrode layers, each positive electrode layer including a positive electrode collector extending to the first end surface and a positive electrode active material disposed on a portion of the positive electrode collector, and each negative electrode layers including a negative electrode collector extending to the second end surface and a negative electrode active material disposed on a portion of the negative electrode collector,
a plurality of resin-containing insulating layers that insulate the plurality of positive electrode layers from the plurality of negative electrode layers, respectively; and
a pair of end surface electrodes adjacent to the first end surface and the second end surface, respectively,
wherein the positive electrode collectors have an average thickness x1 and an average distance y1 between adjacent positive electrode collectors, where:

$0.2\ \mu m \leq x1 \leq 2.0\ \mu m$, $10\ \mu m \leq y1 \leq 30\ \mu m$, $y1 \geq 15x1-5$, and and
wherein the negative electrode collectors have an average thickness x2 and an average distance y2 between adjacent negative electrode collectors, where:

$0.2\ \mu m \leq x2 \leq 2.0\ \mu m$, $10\ \mu m \leq y2 \leq 30\ \mu m$, and $y2 \geq 15x2-5\ \mu m$, wherein each insulating layer between each of the adjacent positive electrode collectors has at least a portion that extends in the thickness direction directly between the adjacent positive electrode collectors, such that the respective portions of the insulating layers have an average thickness equal to y1.

2. The electrical storage device element according to claim 1, wherein the plurality of positive electrode layers and the plurality of negative electrode layers are adhered to and integrated with each other by the resin-containing insulating layers.

3. The electrical storage device element according to claim 1, wherein the resin-containing insulating layers each include a resin material having a glass transition temperature equal to or less than −20° C.

4. The electrical storage device element according to claim 1, wherein the resin-containing insulating layers form a positive electrode extension region of the first end surface and a negative electrode extension region of the second end surface.

5. The electrical storage device element according to claim 4, wherein the positive and negative electrode extension regions each include a plurality of concave portions.

6. The electrical storage device element according to claim 5, wherein the positive electrode collectors and the negative electrode collectors are exposed to voids defined by the concave portions, respectively, to increase a contact area between the respective end surface electrodes and the positive electrode collectors the negative electrode collectors.

7. The electrical storage device element according to claim 5, wherein the pair of end surface electrodes each have concave portions that conform to the positive electrode extension region having the concave portions and the negative electrode extension region having the concave portions, respectively.

8. The electrical storage device element according to claim 1, wherein the plurality of resin-containing insulating layers are not disposed on the positive electrode active material and the negative electrode active material.

9. The electrical storage device element according to claim 8, further comprising electrolyte disposed in a void between the positive electrode active material and the negative electrode active material of each adjacent positive and negative electrode layer.

10. An electrical storage device comprising:
the electrical storage device element according claim 1,
an air-tightly sealed package housing the electrical storage device element and having:
a pair of package electrodes electrically connected to the pair of end surface electrodes, respectively, and electrolyte disposed in the air-tightly sealed package.

* * * * *